US011982202B2

(12) United States Patent
Kitagawa et al.

(10) Patent No.: US 11,982,202 B2
(45) Date of Patent: May 14, 2024

(54) ROTOR DISC, ROTOR SHAFT, TURBINE ROTOR, AND GAS TURBINE

(71) Applicant: Mitsubishi Power, Ltd., Kanagawa (JP)

(72) Inventors: Kazuki Kitagawa, Yokohama (JP); Shinya Hashimoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 22 days.

(21) Appl. No.: 17/604,920

(22) PCT Filed: Apr. 23, 2020

(86) PCT No.: PCT/JP2020/017500
§ 371 (c)(1),
(2) Date: Oct. 19, 2021

(87) PCT Pub. No.: WO2020/241133
PCT Pub. Date: Dec. 3, 2020

(65) Prior Publication Data
US 2022/0228488 A1    Jul. 21, 2022

(30) Foreign Application Priority Data

May 24, 2019   (JP) .................................. 2019-097549

(51) Int. Cl.
*F01D 5/08*      (2006.01)
*F01D 5/06*      (2006.01)
*F01D 25/12*     (2006.01)

(52) U.S. Cl.
CPC ............... *F01D 5/081* (2013.01); *F01D 5/06* (2013.01); *F01D 5/066* (2013.01); *F01D 25/12* (2013.01);
(Continued)

(58) Field of Classification Search
CPC . F01D 5/081; F01D 5/02; F01D 25/12; F01D 5/08; F01D 5/082
See application file for complete search history.

(56) References Cited

U.S. PATENT DOCUMENTS 4,505,640 A *  3/1985  Hsing ................... F01D 11/005
                                                    416/220 R
6,022,190 A    2/2000  Schillinger
(Continued)

FOREIGN PATENT DOCUMENTS

| CN | 101952555 | 1/2011 |
| CN | 101960092 | 1/2011 |

(Continued)

OTHER PUBLICATIONS

International Search Report dated Jul. 21, 2020 in International Application No. PCT/JP2020/017500, with English translation.
(Continued)

*Primary Examiner* — Sabbir Hasan
*Assistant Examiner* — Arthur Paul Golik
(74) *Attorney, Agent, or Firm* — Wenderoth, Lind & Ponack, L.L.P.

(57) ABSTRACT

A rotor disc has diametrically outer surfaces, a diametrically inner surface, a plurality of blade root grooves recessed diametrically inward from the diametrically outer surfaces and aligned in a circumferential direction, and a plurality of hole groups formed in each of the plurality of blade root grooves and aligned in the circumferential direction. Each of the plurality of hole groups has a hole including a cooling orifice penetrating from the diametrically inner surface through to the diametrically outer surface. The width of each of the plurality of hole groups in the circumferential direction is greater than the width of each of the plurality of hole groups in an axial direction and smaller than a minimum gap
(Continued)

among gaps between the plurality of hole groups in the circumferential direction.

8 Claims, 16 Drawing Sheets

(52) U.S. Cl.
CPC ...... *F05D 2220/32* (2013.01); *F05D 2240/24* (2013.01); *F05D 2260/20* (2013.01)

(56) References Cited

U.S. PATENT DOCUMENTS

| | | | | |
|---|---|---|---|---|
| 7,665,965 | B1 * | 2/2010 | Liang | ................ F01D 5/18 416/97 R |
| 2010/0290922 | A1 | 11/2010 | Hashimoto et al. | |
| 2010/0326039 | A1 | 12/2010 | Arase et al. | |
| 2018/0245474 | A1 * | 8/2018 | Alexander | ............. F01D 5/087 |
| 2019/0017383 | A1 | 1/2019 | Batt et al. | |

FOREIGN PATENT DOCUMENTS

| | | |
|---|---|---|
| CN | 108603410 | 9/2018 |
| DE | 19705442 | 8/1998 |
| EP | 3 199 756 | 8/2017 |
| JP | 62-169201 | 10/1987 |
| JP | 2-31355 | 2/1990 |
| JP | 7-40642 | 9/1995 |
| JP | 2009-203870 | 9/2009 |
| JP | 2009-203926 | 9/2009 |
| JP | 2010-196596 | 9/2010 |
| JP | 2015-206462 | 11/2015 |
| WO | 2017/129455 | 8/2017 |

OTHER PUBLICATIONS

Written Opinion of the International Searching Authority dated Jul. 21, 2020 in International Application No. PCT/JP2020/017500, with English translation.

* cited by examiner

ROTOR DISC, ROTOR SHAFT, TURBINE ROTOR, AND GAS TURBINE

TECHNICAL FIELD

The present invention relates to a rotor disc, a rotor shaft, a turbine rotor, and a gas turbine.

Priority is claimed on Japanese Patent Application No. 2019-097549, filed May 24, 2019, the content of which is incorporated herein by reference.

BACKGROUND ART

A gas turbine includes a compressor that compresses air to generate compressed air; a combustor that combusts fuel in the compressed air to generate combustion gas; and a turbine that is driven by the combustion gas. The turbine includes a turbine rotor that rotates around an axis, and a turbine casing that covers the turbine rotor. The turbine rotor includes a rotor shaft that rotates around the axis and that extends in an axial direction, and a plurality of rotor blade rows. The plurality of rotor blade rows are arranged in the axial direction. Each of the plurality of rotor blade rows includes a plurality of rotor blades arranged in a circumferential direction with respect to the axis. For example, a plurality of rotor discs are stacked in the axial direction to form the rotor shaft.

The following PTL 1 discloses a configuration of a rotor disc. The rotor disc includes a radial outer surface facing a radial outer side; a radial inner surface facing a radial inner side; a plurality of blade root grooves recessed from the radial outer surface to the radial inner side and arranged in a circumferential direction; and a plurality of holes recessed from the radial inner surface to the radial outer side. A blade root of a rotor blade is mounted in each of the plurality of blade root grooves. The plurality of holes includes a plurality of first cooling holes and a plurality of second cooling holes. The first cooling hole is provided for each of the plurality of blade root grooves. The first cooling hole communicates with the blade root groove. Air that has passed through a space on the radial inner side from the radial inner surface of the rotor disc flows through the first cooling hole. The air flows into a cooling air flow path in the rotor blade through the blade root groove to cool the rotor blade. The second cooling hole is provided between the plurality of first cooling holes.

When the rotor disc rotates around an axis, tensile stress is generated in the rotor disc. The tensile stress generated in the rotor disc is concentrated in the vicinity of an opening of the cooling hole. When the stress is concentrated in the vicinity of the opening of the cooling hole and the stress concentration factor (=maximum stress/average stress) increases, the durability of the rotor disc is reduced. Therefore, in PTL 1, in order to reduce the stress concentration in the vicinity of the opening of the first cooling hole, the second cooling hole is formed between two first cooling holes adjacent to each other in the circumferential direction, so that the stress concentration in the vicinity of the opening of the first cooling hole is reduced.

CITATION LIST

Patent Literature

[PTL 1] Japanese Unexamined Patent Application Publication No. 2009-203870

SUMMARY OF INVENTION

Technical Problem

An object of the present invention is to provide a technique capable of reducing stress concentration in the vicinity of an opening of a cooling hole and improving the durability of a rotor disc.

Solution to Problem

According to one aspect of the invention to achieve the above object, there is provided a rotor disc including: a radial outer surface facing a radial outer side that is a side away from an axis in a radial direction with respect to the axis; a radial inner surface facing a radial inner side that is a side opposite the radial outer side in the radial direction, and located on the radial inner side of the radial outer surface; a plurality of blade root grooves recessed from the radial outer surface to the radial inner side, and arranged in a circumferential direction with respect to the axis; and a plurality of hole groups formed for the plurality of blade root grooves, and arranged in the circumferential direction. Each of the plurality of hole groups includes holes including a cooling hole penetrating from the radial inner surface to the radial outer surface. A width of each of the plurality of hole groups in the circumferential direction is larger than a width of each of the plurality of hole groups in an axial direction in which the axis extends, and is smaller than a minimum interval of intervals between the plurality of hole groups in the circumferential direction. The cooling hole communicates with an inside of the blade root groove.

In the rotor disc of this aspect, a cooling medium in a space on the radial inner side of the radial inner surface can be guided to a rotor blade through the cooling hole and the blade root groove. When the rotor disc rotates around the axis, tensile stress is generated in the rotor disc. The tensile stress generated in the rotor disc is concentrated in the vicinity of an opening of the cooling hole. As the interval between openings of two holes is reduced, the stress concentration factor is reduced. The reason is that stress generated around the opening of one hole is dispersed around the opening of the adjacent hole.

In this aspect, a circumferential group width that is a width of the hole group in the circumferential direction is larger than an axial group width that is a width of the hole group in the axial direction, and is smaller than a minimum group interval that is the minimum interval of the intervals between the plurality of hole groups in the circumferential direction. It is assumed that the hole group includes a plurality of the holes including the cooling hole. In this case, the hole interval between two holes of one hole group in the circumferential direction is smaller than the minimum group interval. For this reason, in this case, the hole interval between the plurality of holes of one hole group is smaller than when all the holes formed in the rotor disc are arranged at equal intervals in the circumferential direction. Therefore, in this case, the stress concentration in the vicinity of the opening of the cooling hole can be reduced, and the durability of the rotor disc can be improved.

In addition, it is assumed that the width of a cross section of the cooling hole of the hole group in the circumferential direction is larger than the width of the cross section of the cooling hole in the axial direction. As described above, the interval between the openings of the two holes is reduced, the stress concentration factor is reduced. Therefore, when the interval between the openings of the two holes is reduced, and the openings of the two holes are connected to each other to form one opening, stress generated around the opening of the hole is reduced. The reason is that the stress is dispersed in a direction in which the two holes are connected to each other. The cooling hole in this case has a shape in which two holes are connected to each other in the circumferential direction. For this reason, in this case, the stress generated around the opening of the cooling hole is dispersed in the circumferential direction. Therefore, also in this case, the stress concentration in the vicinity of the opening of the cooling hole can be reduced, and the durability of the rotor disc can be improved.

Here, in the rotor disc of this aspect, each of the plurality of hole groups may include a plurality of the holes recessed from the radial inner surface to the radial outer side and arranged in the circumferential direction. In this case, at least one of the plurality of holes is the cooling hole.

This aspect is the case where the hole group includes the plurality of holes including the cooling hole described above. Therefore, in this aspect, the stress concentration in the vicinity of the opening of the cooling hole can be reduced, and the durability of the rotor disc can be improved.

In the rotor disc according to this aspect in which the hole group includes the plurality of holes, a maximum hole interval of intervals between the plurality of holes of the hole group in the circumferential direction may be smaller than the minimum interval of the intervals between the plurality of hole groups in the circumferential direction.

In the rotor disc according to one of the above aspects in which the hole group includes the plurality of holes, all the plurality of holes of the hole group may be the cooling holes.

In addition, in the rotor disc according to this aspect, a width of an inner opening, which is an opening of the cooling hole on the radial inner surface, in the circumferential direction may be larger than a width of the inner opening in the axial direction.

This aspect is basically the same as the case where the width of the cross section of the cooling hole in the circumferential direction is larger than the width of the cross section of the cooling hole in the axial direction described above. Therefore, in this aspect, the stress concentration in the vicinity of the inner opening of the cooling hole can be reduced, and the durability of the rotor disc can be improved.

In the rotor disc according to this aspect in which the width of the inner opening of the cooling hole in the circumferential direction is larger than the width of the inner opening in the axial direction, a width of an outer opening, which is an opening of the cooling hole on the radial outer surface, in the circumferential direction may be larger than a width of the outer opening in the axial direction.

In this aspect, the stress concentration in the vicinity of the outer opening of the cooling hole can be reduced, and the durability of the rotor disc can be improved.

In the rotor disc according to one of the above aspects, a position of an opening of the cooling hole on the radial outer surface in the circumferential direction may be in a region in the circumferential direction in which a groove bottom surface of the blade root groove is present.

In the rotor disc according to one of the above aspects, a region of the radial inner surface around an opening of the hole of the hole group on the radial inner surface may be perpendicular to a direction in which the hole extends on a virtual plane including the axis and the hole.

It is assumed that the region of the radial inner surface around the opening of the hole on the radial inner surface is an inclined surface (region inner surface) that is inclined with respect to the direction in which the hole extends on the virtual plane including the axis and the hole. In this case, an angle at a corner between a generating line on an axial downstream side of a columnar hole and the inclined surface is an obtuse angle, and an angle at a corner between a generating line on an axial upstream side of the columnar hole and the inclined surface is an acute angle. For this reason, stress is concentrated at an edge of the inner opening on the axial upstream side. In this aspect, both the angle at the corner between the generating line on the axial downstream side of the columnar hole and the region inner surface and the angle at the corner between the generating line on the axial upstream side of the columnar hole and the region inner surface are 90°, so that stress can be prevented from being concentrated at the edge of the inner opening on the axial upstream side.

According to one aspect of the invention to achieve the above object, there is provided a rotor shaft including: a plurality of the rotor discs according to one of the above aspects; and a spindle bolt penetrating through the plurality of rotor discs in the axial direction to connect the plurality of rotor discs to each other, the rotor discs being arranged in the axial direction.

According to one aspect of the invention to achieve the above object, there is provided a turbine rotor including: the rotor shaft according to this aspect; and a rotor blade mounted in the blade root groove of each of the plurality of rotor discs.

According to one aspect of the invention to achieve the above object, there is provided a gas turbine including: the turbine rotor according to this aspect; and a turbine casing covering an outer periphery of the turbine rotor.

Advantageous Effects of Invention

According to one aspect of the present invention, the stress concentration in the vicinity of the opening of the cooling hole can be reduced, and the durability of the rotor disc can be improved.

DESCRIPTION OF EMBODIMENTS

Hereinafter, an embodiment of a gas turbine including a rotor disc according to the present invention and various embodiments of the rotor disc will be described with reference to the drawings.

[Implementation of Gas Turbine]

An embodiment of a gas turbine according to the present invention will be described with reference to the drawings.

Figure 1:
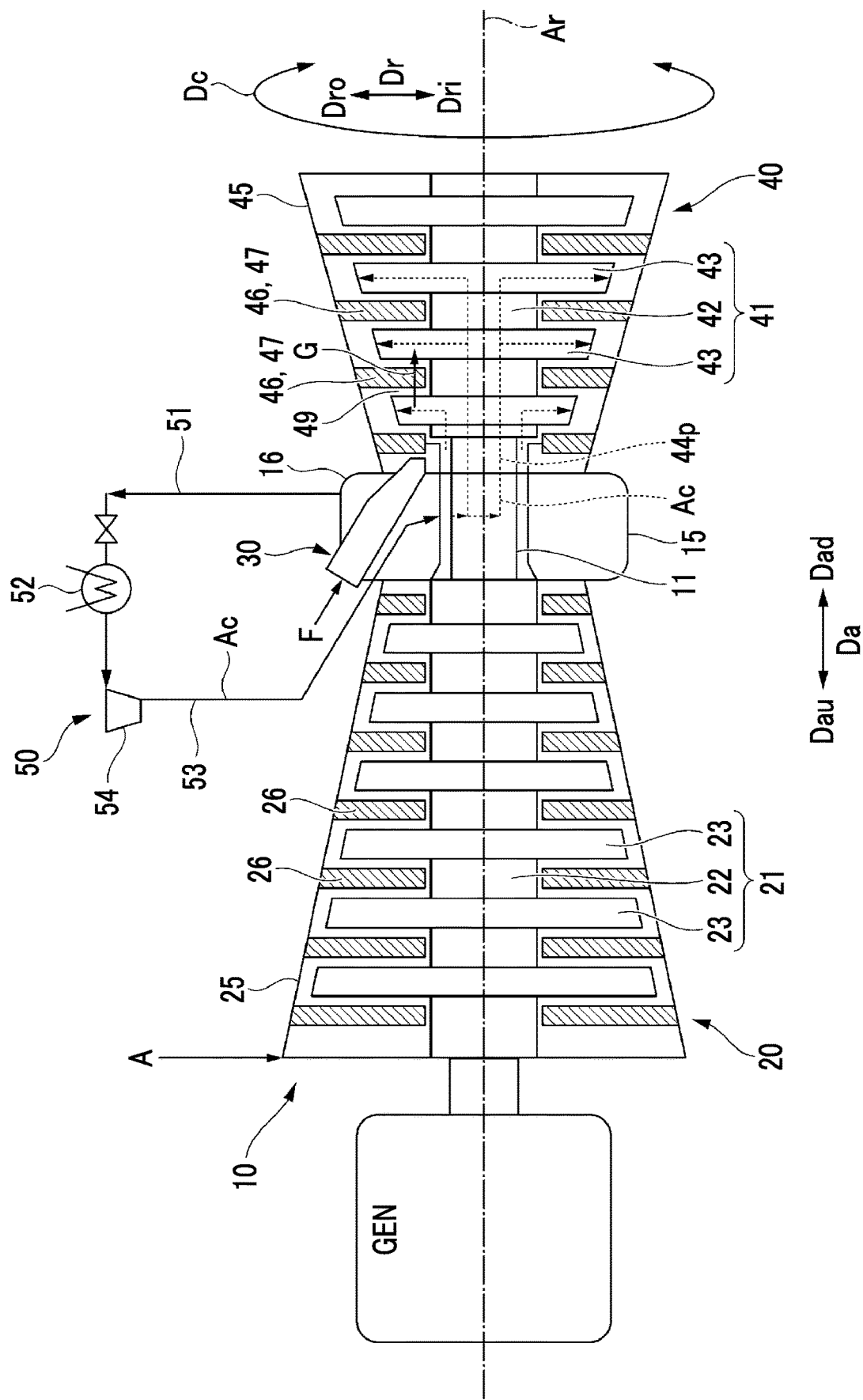
FIG. 1 is a schematic view illustrating a configuration of a gas turbine as one embodiment according to the present invention.

As illustrated in FIG. 1, a gas turbine 10 of the present embodiment includes a compressor 20 that compresses air A; a combustor 30 that combusts fuel F in the air A compressed by the compressor 20 to generate combustion gas G; and a turbine 40 that is driven by the combustion gas G.

The compressor 20 includes a compressor rotor 21 that rotates around an axis Ar; a compressor casing 25 that covers the compressor rotor 21; and a plurality of stator blade rows 26. The turbine 40 includes a turbine rotor 41 that rotates around the axis Ar; a turbine casing 45 that covers the turbine rotor 41; and a plurality of stator blade rows 46. Hereinafter, a direction in which the axis Ar extends is referred to as an axial direction Da, a circumferential direction around the axis Ar is simply referred to as a circumferential direction Dc, and a direction perpendicular to the axis Ar is referred to as a radial direction Dr. In addition, one side in the axial direction Da is referred to as an axial upstream side Dau, and an opposite side is referred to as an axial downstream side Dad. In addition, a side approaching the axis Ar in the radial direction Dr is referred to as a radial inner side Dri, and an opposite side is referred to as a radial outer side Dro.

The gas turbine 10 of the present embodiment further includes an intermediate casing 16. The compressor 20 is disposed on the axial upstream side Dau with respect to the turbine 40. The intermediate casing 16 is disposed between the compressor casing 25 and the turbine casing 45 in the axial direction Da, and connects the compressor casing 25 and the turbine casing 45. The compressor rotor 21 and the turbine rotor 41 are located on the same axis Ar, and are connected to each other to form a gas turbine rotor 11. For example, a rotor of a generator GEN is connected to the gas turbine rotor 11. In addition, the compressor casing 25, the intermediate casing 16, and the turbine casing 45 are connected to each other to form a gas turbine casing 15.

The compressor rotor 21 includes a rotor shaft 22 extending in the axial direction Da and having the axis Ar as a center, and a plurality of rotor blade rows 23 attached to the rotor shaft 22. The plurality of rotor blade rows 23 are arranged in the axial direction Da. Each of the rotor blade rows 23 is formed of a plurality of rotor blades arranged in the circumferential direction Dc. The stator blade row 26 is disposed on the axial downstream side Dad of each of the plurality of rotor blade rows 23. Each of the stator blade rows 26 is provided inside the compressor casing 25. Each of the stator blade rows 26 is formed of a plurality of stator blades arranged in the circumferential direction Dc.

The turbine rotor 41 includes a rotor shaft 42 extending in the axial direction Da and having the axis Ar as a center, and a plurality of rotor blade rows 43 attached to the rotor shaft 42. The plurality of rotor blade rows 43 are arranged in the axial direction Da. Each of the rotor blade rows 43 is formed of a plurality of rotor blades 44 arranged in the circumferential direction Dc. The stator blade row 46 is disposed on the axial upstream side Dau of each of the plurality of the rotor blade rows 43. Each of the stator blade rows 46 is provided on the radial inner side of the turbine casing 45. Each of the stator blade rows 46 is formed of a plurality of stator blades 47 arranged in the circumferential direction Dc.

Figure 2:
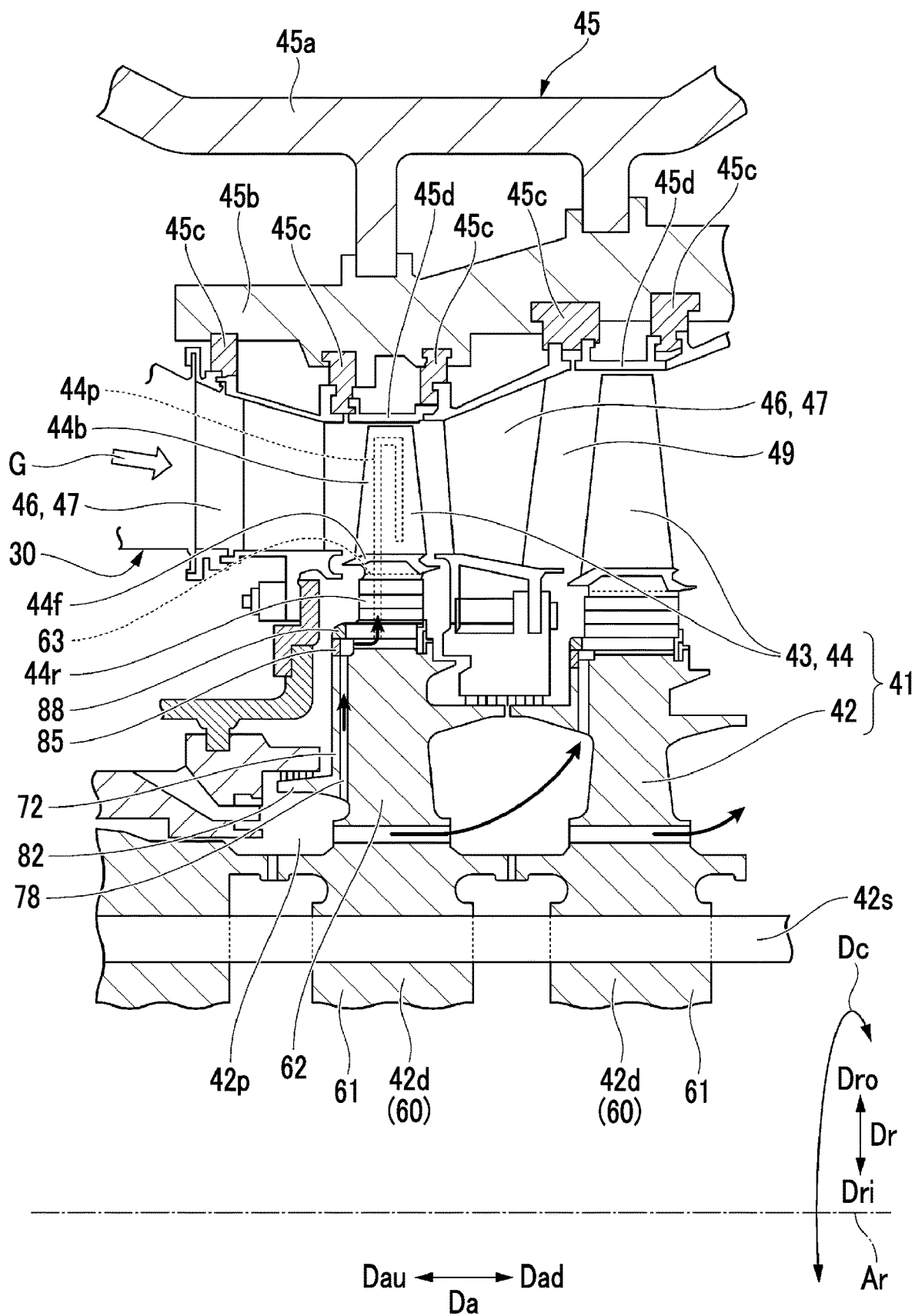
FIG. 2 is a sectional view of a main part of a turbine as one embodiment according to the present invention.

As illustrated in FIG. 2, the turbine casing 45 includes an outer casing 45a having a tubular shape and forming an outer shell of the turbine casing 45; an inner casing 45b fixed to a radial inner side of the outer casing 45a; a plurality of heat shield rings 45c fixed to a radial inner side of the inner casing 45b; and a ring segment 45d fixed to a radial inner side of each of the plurality of heat shield rings 45c. Each of a plurality of the ring segments 45d is provided at a position between the plurality of stator blade rows 46. Therefore, the rotor blade row 43 is disposed on the radial inner side Dri of each of the ring segments 45d. In addition, the stator blade 47 is also fixed to the radial inner side Dri of each of the plurality of heat shield rings 45c.

An annular space between an outer peripheral side of the rotor shaft 42 and an inner peripheral side of the turbine casing 45, in which the stator blades 47 and the rotor blades 44 are disposed in the axial direction Da, forms a combustion gas flow path 49 through which the combustion gas G from the combustor 30 flows.

As illustrated in FIG. 1, the gas turbine 10 of the present embodiment is provided with a cooling device 50. The cooling device 50 is a device that cools high-temperature components in contact with the high-temperature combustion gas among gas turbine components. The cooling device 50 includes an air bleeding line 51 that bleeds compressed air in the intermediate casing 16; a cooler 52 that is provided in the air bleeding line 51; a cooling air line 53 that guides the compressed air which has been cooled by the cooler 52, as cooling air, to the turbine rotor 41 that is one of the high-temperature components; and a booster 54 that is provided in the cooling air line 53 and that boosts the cooling air. A cooling air flow path 42p is formed in the rotor shaft 42 of the turbine 40. The cooling air flow path 42p extends to the plurality of rotor blades 44 attached to the rotor shaft 42.

As illustrated in FIG. 2, the rotor shaft 42 includes a plurality of rotor discs 42d arranged in the axial direction Da, and a spindle bolt 42s that penetrates through the plurality of rotor discs 42d in the axial direction Da to connect the plurality of rotor discs 42d to each other. The plurality of rotor blades 44 forming one rotor blade row 43 are attached to one rotor disc 42d. The rotor blade 44 includes a blade body 44b having a blade shape; a platform 44f formed on the radial inner side Dri of the blade body 44b; and a blade root 44r formed on the radial inner side Dri of the platform 44f. A cooling air passage 44p through which the cooling air flows is formed in the rotor blade 44. An inlet opening of the cooling air passage 44p is formed in a bottom surface of the blade root 44r, the bottom surface facing the radial inner side Dri.

As illustrated in FIG. 1, the compressor 20 compresses the air A to generate the compressed air. The compressed air flows from the compressor 20 into the intermediate casing 16. Some of the compressed air that has flowed into the intermediate casing 16 flows into the combustor 30. The fuel F is supplied to the combustor 30. In the combustor 30, the fuel F is combusted in the compressed air to generate the high-temperature and high-pressure combustion gas G. The combustion gas G is delivered from the combustor 30 into the combustion gas flow path 49 inside the turbine 40. The combustion gas G rotates the turbine rotor 41 in the process of flowing through the combustion gas flow path 49 to the axial downstream side Dad. The rotor of the generator GEN connected to the gas turbine rotor 11 is rotated by the rotation of the turbine rotor 41. As a result, the generator GEN generates electricity.

The rotor blade 44 or the stator blade 47 of the turbine 40 is exposed to the high-temperature combustion gas G. For this reason, the rotor blade 44 or the stator blade 47 is cooled by a cooling medium. The rotor blade 44 of the present embodiment is cooled by the cooling air from the cooling device 50. Some of the compressed air generated by the compressor 20 is bled from the intermediate casing 16. The compressed air flows into the cooler 52 through the air bleeding line 51, and is cooled here. The compressed air that has been cooled by the cooler 52 is boosted by the booster 54, and then flows into the cooling air flow path 42p of the rotor shaft 42 through the cooling air line 53 as cooling air Ac. The cooling air Ac flows from the cooling air flow path 42p of the rotor shaft 42 into the cooling air passage 44p of the rotor blade 44 to cool the rotor blade 44.

The rotor disc 42d described above is a rotor disc to be described in any one of the following embodiments and modification examples.

First Embodiment of Rotor Disc

Hereinafter, a rotor disc of the present embodiment will be described with reference to FIGS. 2 to 8.

Figure 3:
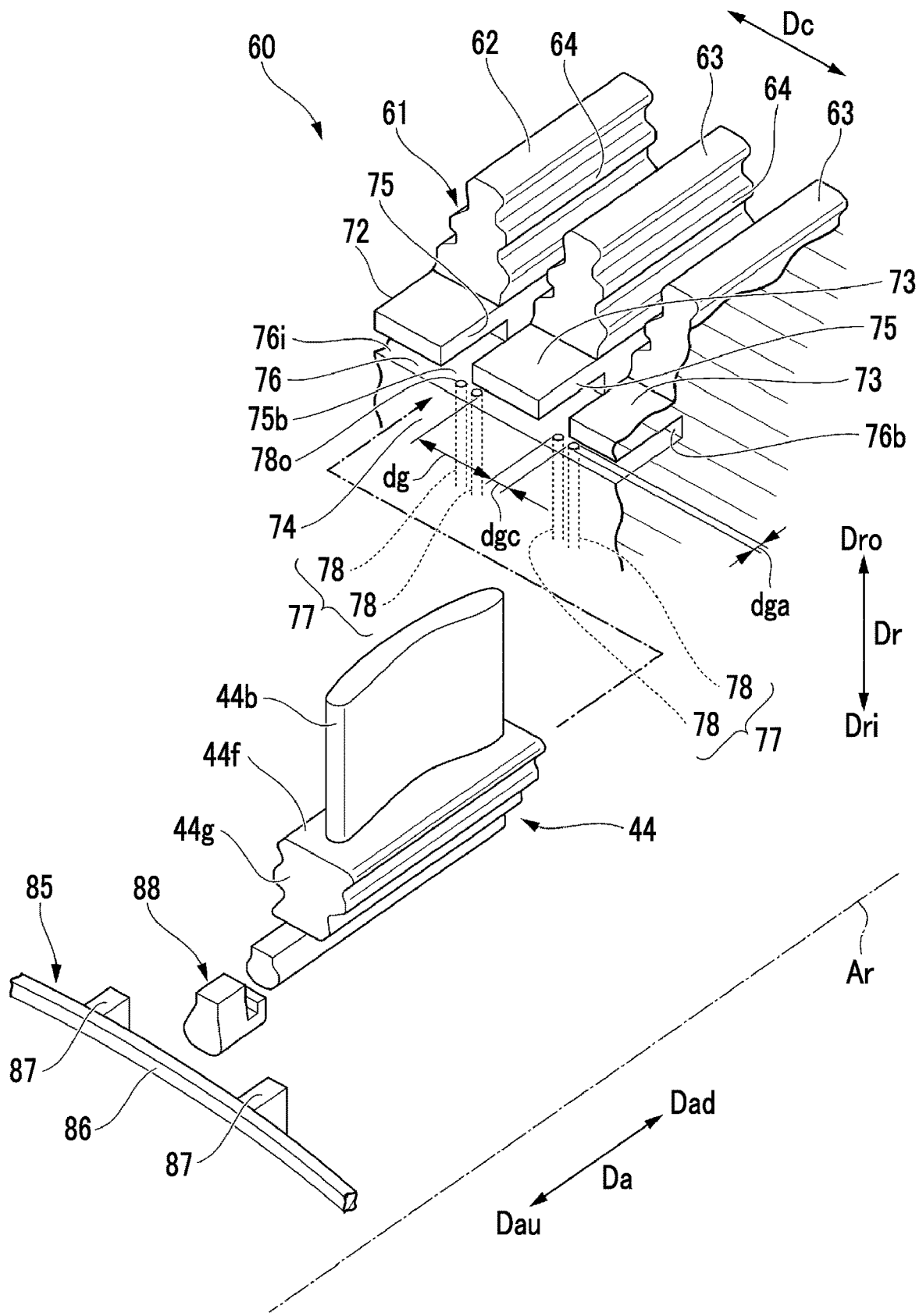
FIG. 3 is a perspective view of a main part of a turbine disc as one embodiment according to the present invention.
Figure 4:
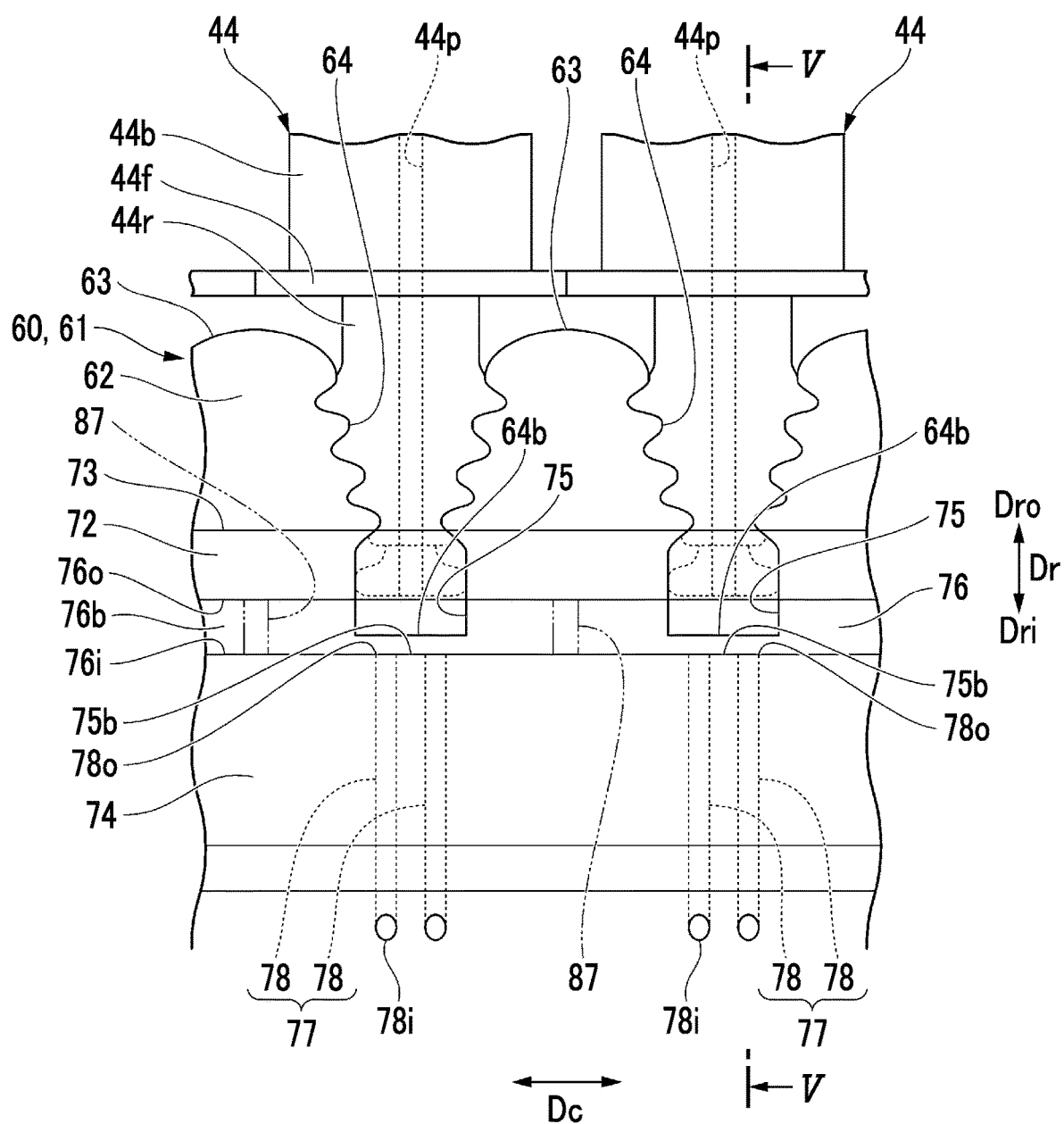
FIG. 4 is a view of a disc body and a rotor blade as a first embodiment according to the present invention as seen from an axial upstream side.
Figure 5:
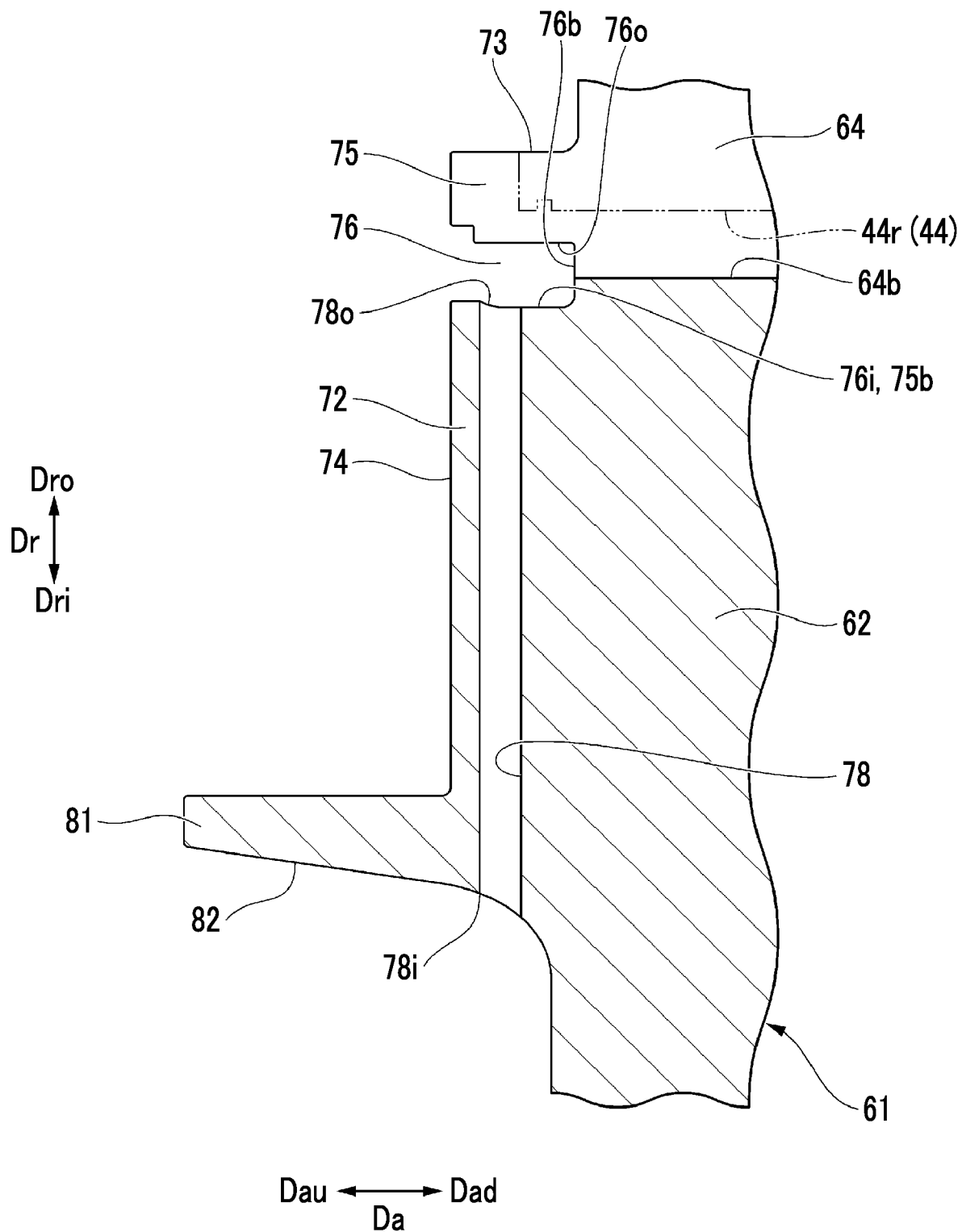
FIG. 5 is a sectional view of the disc body taken along line V-V of in FIG. 4.

As illustrated in FIGS. 2 and 3, a rotor disc 60 of the present embodiment includes a disc body 61, a seal ring 85, and a seal cap 88.

The disc body 61 includes a large-diameter portion 62 (a first diameter portion), a small-diameter portion 72 (a second diameter portion), and a plurality of extension portions 81 and 83. Both the large-diameter portion 62 and the small-diameter portion 72 have a substantially columnar shape around the axis Ar. A radius of the large-diameter portion 62 is larger than a radius of the small-diameter portion 72. The small-diameter portion 72 is provided on the axial upstream side Dau of the large-diameter portion 62. The extension portions 81 and 83 include an upstream extension portion 81 extending from a surface on the axial upstream side Dau of the small-diameter portion 72 to the axial upstream side Dau, and a downstream extension portion 83 extending from a surface on the axial downstream side Dad of the large-diameter portion 62 to the axial downstream side Dad, respectively.

The large-diameter portion 62 includes an outer peripheral surface 63 (a first outer peripheral surface) facing the radial outer side Dro, and a plurality of blade root grooves 64 recessed from the outer peripheral surface 63 toward the radial inner side Dri. The plurality of blade root grooves 64 are arranged at equal intervals in the circumferential direction Dc. The blade root 44r of the rotor blade 44 is mounted in each of the plurality of blade root grooves 64.

As illustrated in FIGS. 3 to 6, the small-diameter portion 72 includes an outer peripheral surface 73 (a second outer peripheral surface) facing the radial outer side Dro; a front surface 74 facing the axial upstream side Dau; a plurality of communication grooves 75 recessed from the outer peripheral surface 73 to the radial inner side Dri; and an annular groove 76 recessed from the front surface 74 to the axial downstream side Dad and extending in the circumferential direction Dc with respect to the axis Ar. Each of the plurality of communication grooves 75 is formed at the same position as that of one blade root groove 64 of the plurality of blade root grooves 64 in the circumferential direction Dc. A distance from the axis Ar to a groove bottom surface 75b of the communication groove 75 is substantially equal to a distance from the axis Ar to a groove bottom surface 64b of the blade root groove 64. For this reason, each of the plurality of communication grooves 75 communicates with one blade root groove 64 of the plurality of blade root grooves 64. The annular groove 76 includes an inner groove side surface 76i facing the radial outer side Dro; an outer groove side surface 76o facing the radial inner side Dri; and a groove bottom surface 76b facing the axial upstream side Dau. The inner groove side surface 76i is located on the radial inner side Dri of the outer groove side surface 76o. A part of the inner groove side surface 76i of the annular groove 76 forms the groove bottom surface 75b of the communication groove 75. For this reason, the annular groove 76 communicates with the plurality of communication grooves 75. All of the inner groove side surface 76i of the annular groove 76, the groove bottom surface 75b of the communication groove 75, and the groove bottom surface 64b of the blade root groove 64 are radial outer surfaces facing the radial outer side Dro.

The small-diameter portion 72 further includes a plurality of hole groups (channel groups) 77 arranged in the circumferential direction Dc. The plurality of hole groups 77 are provided for the plurality of blade root grooves 64. Namely, one hole group 77 is provided for one blade root groove 64. One hole group 77 includes a plurality of holes (channels), two holes in the present embodiment, which are recessed from a radial inner surface 82 of the upstream extension portion 81 toward the radial outer side Dro. The radial inner surface 82 of the upstream extension portion 81 is located on the radial inner side Dri of the inner groove side surface 76i and the groove bottom surface 75b of the small-diameter portion 72, and the groove bottom surface 64b of the blade root groove 64 of the large-diameter portion 62. In the present embodiment, all the plurality of holes form respective cooling holes (cooling channels) 78 penetrating from the radial inner surface 82 of the upstream extension portion 81 to the radial outer surface that is the groove bottom surface 75b of the communication groove 75 (inner groove side surface 76i of the annular groove 76). Two cooling holes 78 are open in the groove bottom surface 75b of one communication groove 75. Hereinafter, the opening will be referred to as an outer opening 78o. As described above, the communication groove 75 communicates with the blade root groove 64. Therefore, the cooling hole 78 communicates with a space in the blade root groove 64 through a space in the communication groove 75. The cross-sectional shape of the cooling hole 78 is a circle. The cross section referred to here is a plane extending in a direction perpendicular to a direction in which the cooling hole 78 extends. A plurality of the cooling holes 78 are arranged in the circumferential direction Dc.

The radial inner side Dri of the upstream extension portion 81 serves as a cooling air space (refer to FIG. 2) into which the cooling air from the cooling device 50 flows. Therefore, the cooling air that has flowed into the cooling air space flows into the blade root groove 64 through the cooling hole 78 and the space in the communication groove 75. The cooling air that has flowed into the space in the blade root groove 64 flows into the cooling air passage 44p of the rotor blade 44. Therefore, in the present embodiment, the cooling air flow path 42p of the rotor shaft 42 described with reference to FIG. 2 includes the cooling air space, the cooling hole 78, the space in the communication groove 75, and the space in the blade root groove 64.

The seal ring 85 includes a ring piece 86 extending in the circumferential direction Dc, and a plurality of partition pieces 87. The ring piece 86 closes a part of an opening in the circumferential direction Dc of the annular groove 76. The partition piece 87 protrudes from a surface on the axial downstream side Dad of the ring piece 86 to the axial downstream side Dad to partition the inside of the annular groove 76 in the circumferential direction Dc.

Figure 6:
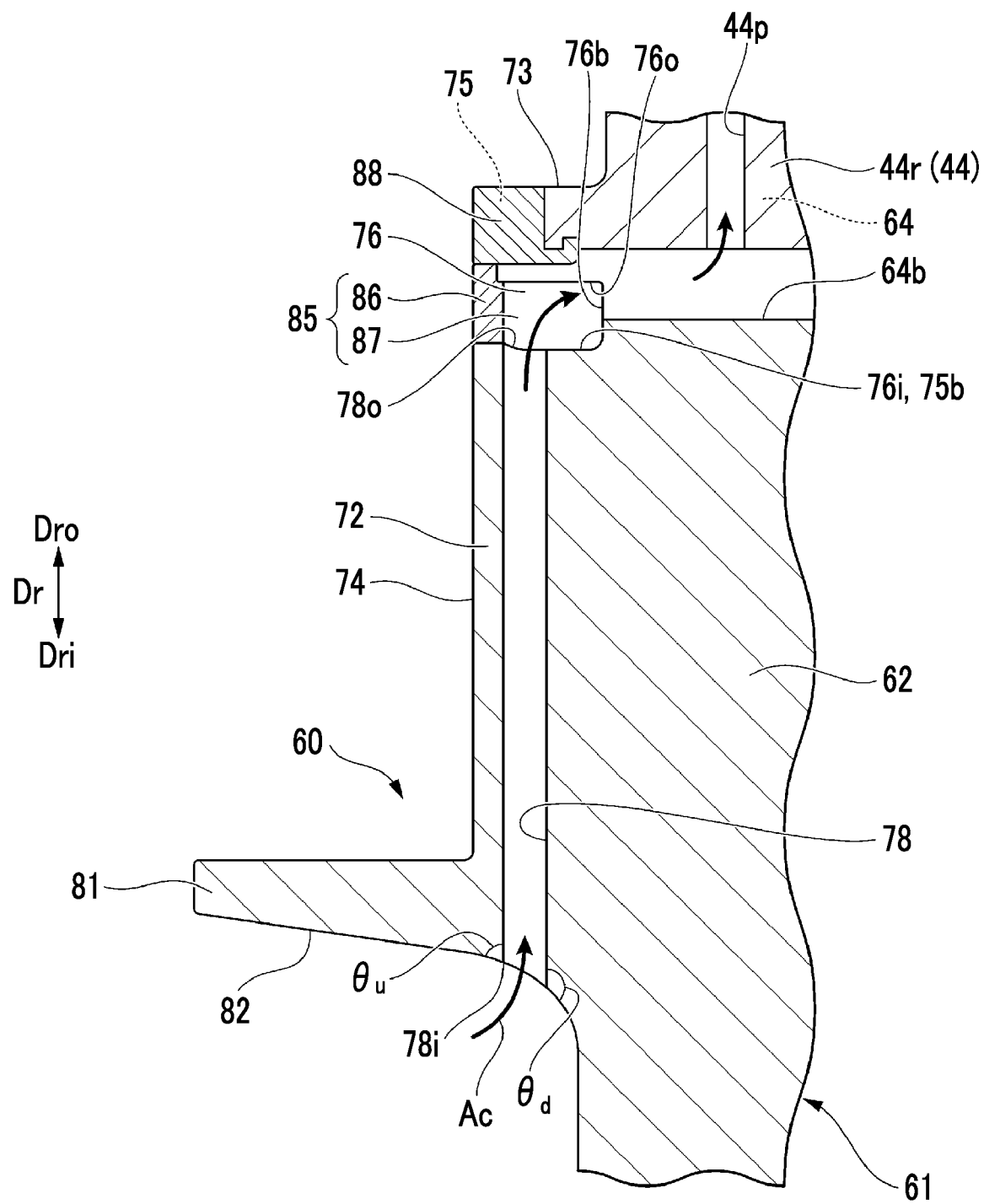
FIG. 6 is a sectional view of a main part of a rotor disc as the first embodiment according to the present invention.

As illustrated in FIGS. 3 and 6, the seal cap 88 closes an opening of the communication groove 75. The seal cap 88 is in contact with the seal ring 85 and the blade root 44r to fill a gap therebetween.

Figure 7:
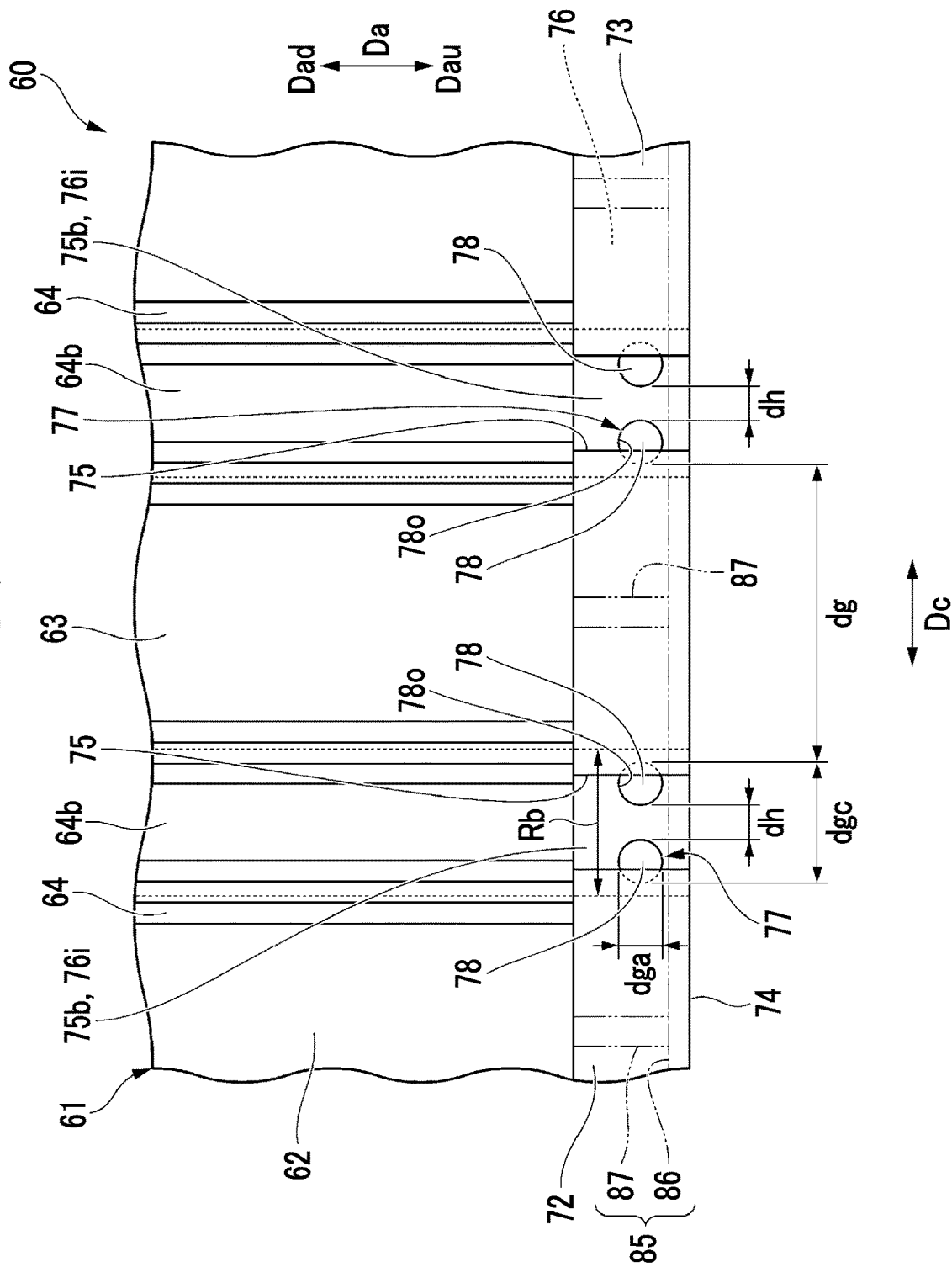
FIG. 7 is a view of a disc body as the first embodiment according to the present invention as seen from a radial outer side.

As illustrated in FIGS. 3 and 7, the position of the outer opening 78o of the cooling hole 78 in the circumferential direction Dc is in a region Rb in the circumferential direction Dc in which the groove bottom surface 64b of the blade root groove 64 is present. In the circumferential direction Dc, each of the plurality of partition pieces 87 of the seal ring 85 is located between the region Rb and the region Rb in the circumferential direction Dc in which the groove bottom surface 64b of another blade root groove 64 adjacent to the blade root groove 64 is present. For this reason, a space in the annular groove 76 is partitioned by the partition piece 87 in the circumferential direction Dc into a space of a portion in which a blade root groove 64 is present and a space of a portion in which another blade root groove 64 adjacent to the blade root groove 64 in the circumferential direction Dc is present.

A circumferential group width dgc that is a width of each of the plurality of hole groups 77 in the circumferential direction Dc is larger than an axial group width dga that is a width of each of the plurality of hole groups 77 in the axial direction Da, and is smaller than a minimum group interval dg of group intervals, each of which is an interval between the plurality of hole groups 77 in the circumferential direction Dc. The axial group width dga coincides with the diameter of the circular outer opening 78o of the cooling hole 78. The circumferential group widths dgc, each of which is the width of each of the plurality of hole groups 77 in the circumferential direction Dc (an outermost width of the plurality of holes of each hole group 77) are the same as each other. The group interval between two hole groups 77 adjacent to each other in the circumferential direction Dc is the same as the group interval between another two hole groups 77 adjacent to each other in the circumferential direction Dc. Namely, the group intervals are the same as each other. Therefore, in the present embodiment, each of the group intervals is also the minimum group interval dg. A hole interval (channel interval) dh that is an interval in the circumferential direction Dc between two cooling holes 78 forming one hole group 77 is a dimension obtained by subtracting twice the diameter (=dga) of the cooling hole 78 from the circumferential group width dgc (=dgc−2·dga). Therefore, a magnitude relationship between the dimensions is as follows.

$$dg > dgc > (dga, dh)$$

The magnitude relationship between dga and dh does not matter.

The magnitude relationship between the dimensions described above is a magnitude relationship in the inner groove side surface 76i in which the outer opening 78o of the cooling hole 78 is formed. However, in the present embodiment, a magnitude relationship between the dimensions in the radial inner surface 82 in which an inner opening 78i of the cooling hole 78 is formed, and a magnitude relationship between the dimensions at a position between the inner groove side surface 76i and the radial inner surface 82 are the same as the magnitude relationship between the dimensions in the inner groove side surface 76i.

Figure 8:
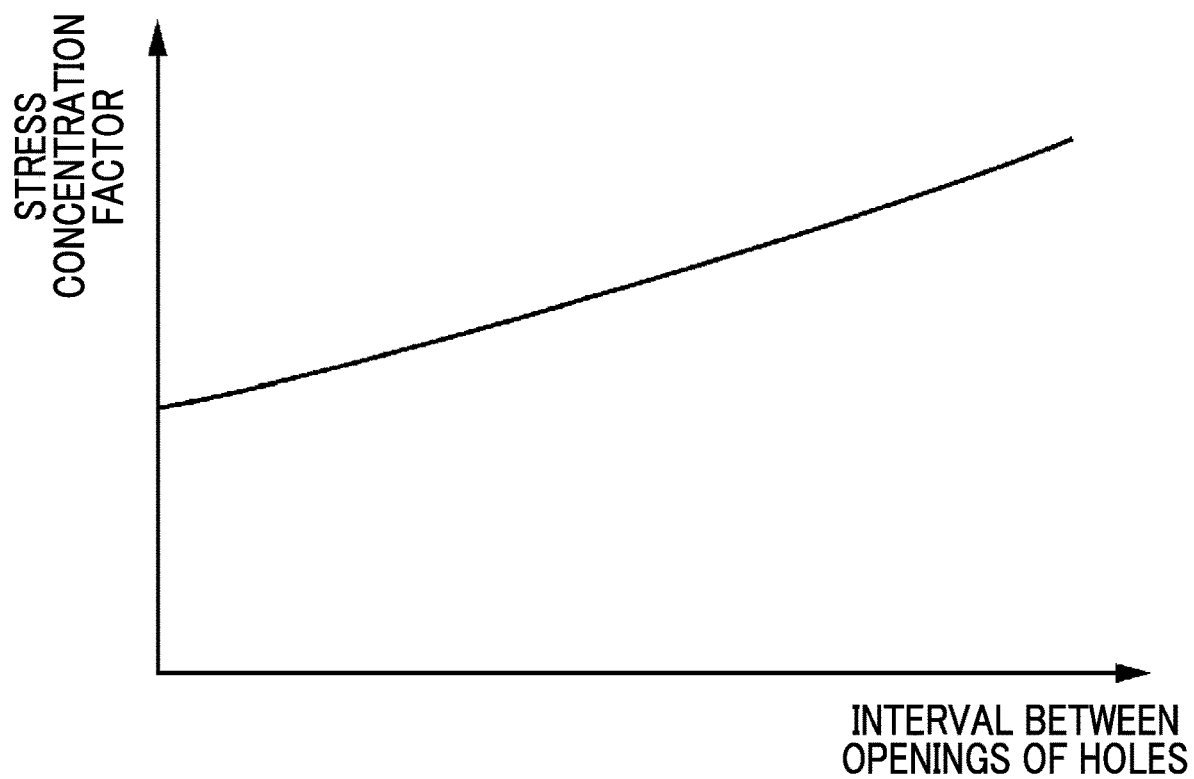
FIG. 8 is a graph illustrating a relationship between a stress concentration factor and an interval between openings of holes.

As illustrated in FIG. 8, as the interval between the openings of the two holes is reduced, the stress concentration factor is reduced. The reason is that stress generated around the opening of one hole is dispersed around the opening of the adjacent hole. The stress concentration factor is a value obtained by dividing a maximum stress σmax generated in a member by an average stress σave generated in the member (=σmax/σave).

In the present embodiment, as described above, the circumferential group width dgc is smaller than the minimum group interval dg. Therefore, the hole interval dh between two cooling holes 78 forming one hole group 77 is smaller than the minimum group interval dg. For this reason, in the present embodiment, the hole interval dh between two cooling holes 78 forming one hole group 77 is smaller than when all the cooling holes 78 formed in the small-diameter portion 72 are arranged at equal intervals in the circumferential direction Dc. Therefore, in the present embodiment, the stress concentration in the vicinity of the opening of the cooling hole 78 can be reduced, and the durability of the rotor disc 60 can be improved.

Second Embodiment of Rotor Disc

Hereinafter, a rotor disc of the present embodiment will be described with reference to FIGS. 9 and 10.

A rotor disc 60a of the present embodiment has a different configuration of a plurality of hole groups from that of the rotor disc 60 of the first embodiment, and has basically the same other configurations as those of the rotor disc 60 of the first embodiment. Therefore, hereinafter, a plurality of hole groups in the rotor disc 60a of the present embodiment will be mainly described.

Figure 9:
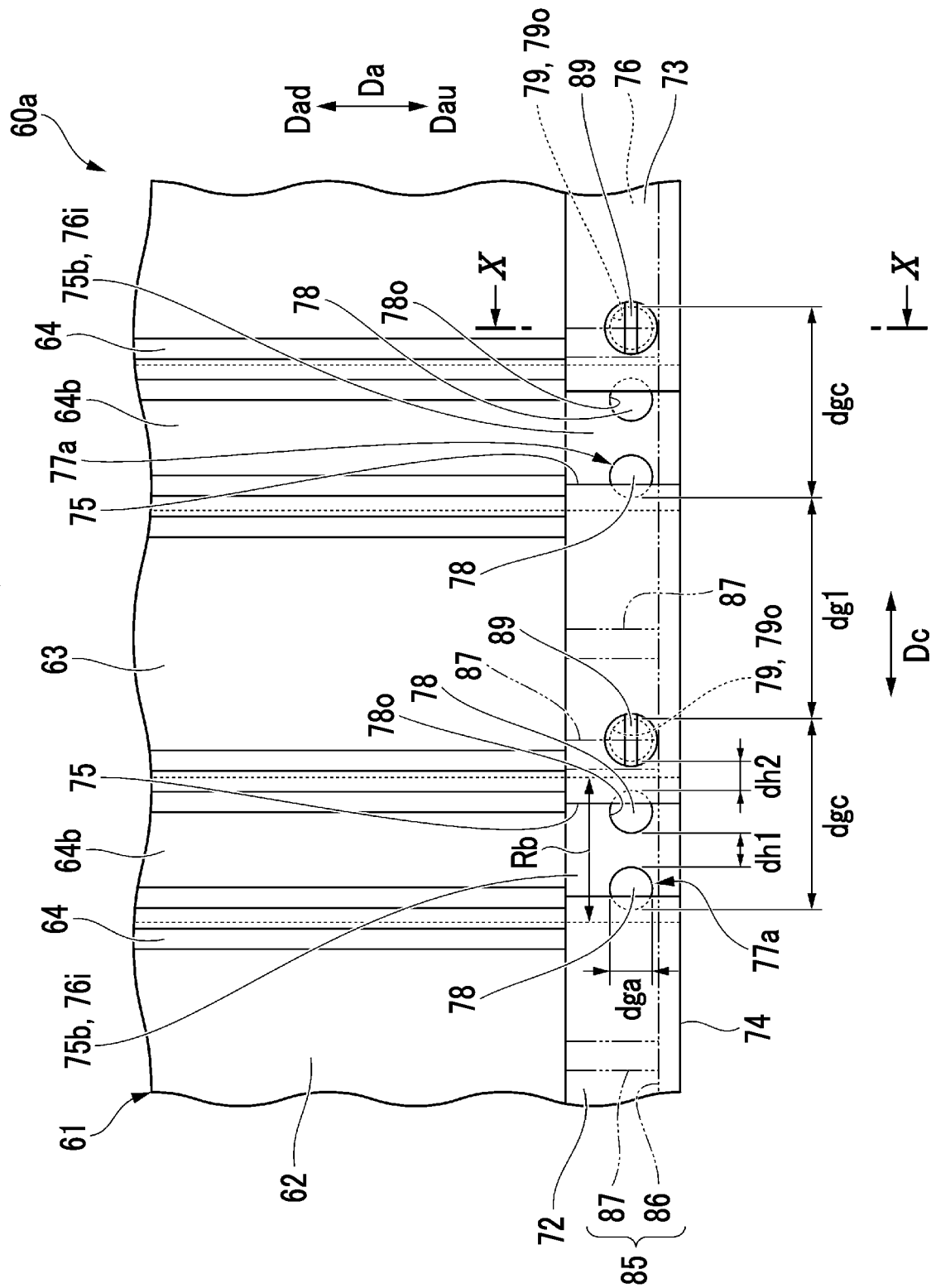
FIG. 9 is a view of a disc body as a second embodiment according to the present invention as seen from the radial outer side.
Figure 10:
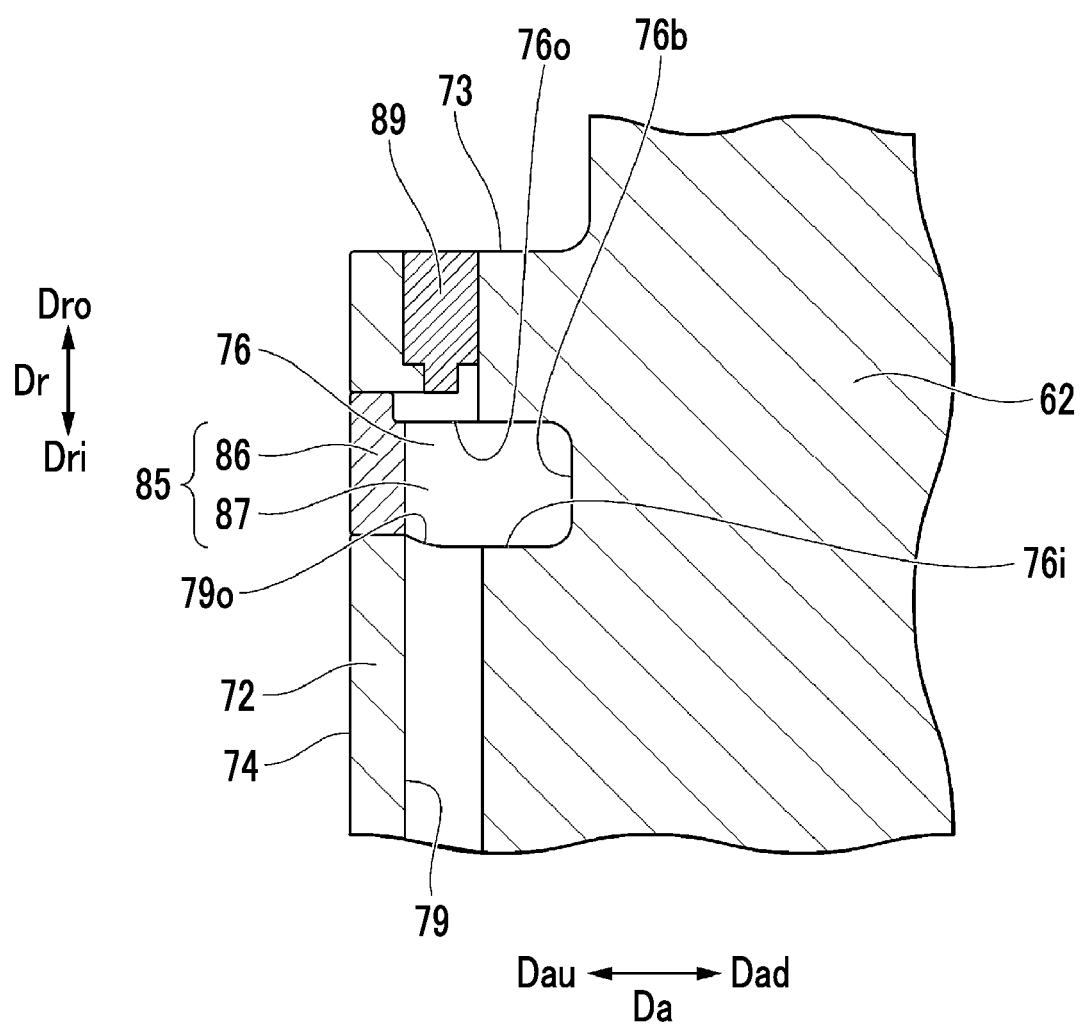
FIG. 10 is a sectional view taken along line X-X in FIG. 9.

As illustrated in FIG. 9, in the present embodiment, each of a plurality of hole groups (channel groups) 77a includes three holes (channels) recessed from the radial inner surface 82 of the upstream extension portion 81 toward a radial outer side. Two holes of the three holes form the cooling hole (cooling channel) 78 penetrating from the radial inner surface 82 of the upstream extension portion 81 to the radial outer surface that is the groove bottom surface 75b of the communication groove 75 (inner groove side surface 76i of the annular groove 76). Similarly to the cooling hole 78, one remaining hole (channel) 79 also penetrates from the radial inner surface 82 of the upstream extension portion 81 to the radial outer surface that is the inner groove side surface 76i of the annular groove 76. The hole 79 further penetrates from the outer groove side surface 76o of the annular groove 76 to the outer peripheral surface 73 of the small-diameter portion 72. The hole 79 is a dummy hole that does not function as a hole through which the cooling air Ac passes. As illustrated in FIG. 10, an opening of the dummy hole 79 in the outer peripheral surface 73 of the small-diameter portion 72 is closed with a plug 89.

Similarly to the cooling hole 78 of the first embodiment, the position of the outer opening 78o of the cooling hole 78 in the circumferential direction Dc is in the region Rb in the circumferential direction Dc in which the groove bottom surface 64b of the blade root groove 64 is present. The position of an outer opening 79o of the dummy hole 79 (radial outer surface) of the annular groove 76 in the inner groove side surface 76i in the circumferential direction Dc is shifted from the region Rb in the circumferential direction Dc in which the groove bottom surface 64b of the blade root groove 64 is present. One partition piece 87 of the plurality of partition pieces 87 of the seal ring 85 is located between the cooling hole 78 of two cooling holes 78 of one hole group 77a and the dummy hole 79 in the circumferential direction Dc, the cooling hole 78 being closest to the dummy hole 79 of the hole group 77a. In addition, the other partition piece 87 is located between the hole group 77a and another hole group 77a adjacent to the hole group 77a in the circumferential direction Dc. For this reason, a space in the annular groove 76 is partitioned by the partition piece 87 in the circumferential direction Dc into a space of a portion in which the blade root groove 64 is present (portion in which the outer openings 78o of two cooling holes 78 are present) and a space of a portion in which the blade root groove 64 is not present. Therefore, the dummy hole 79 and the inside of the blade root groove 64 do not communicate with each other. For this reason, even if the cooling air Ac flows into the dummy hole 79, the cooling air Ac is not capable of flowing into the cooling air passage 44p of the rotor blade 44 through the blade root groove 64.

Similarly to the first embodiment, the circumferential group width dgc of each of the plurality of hole groups 77a is larger than the axial group width dga of each of the plurality of hole groups 77a, and is smaller than a minimum group interval dg1 between the plurality of hole groups 77a. The axial group width dga coincides with the diameter of the circular outer opening 78o of the cooling hole 78. Also in the present embodiment, the circumferential group widths dgc of the plurality of hole groups 77a are the same as each other. A group interval dg1 between two hole groups 77a adjacent to each other in the circumferential direction Dc is the same as the group interval dg1 between another two hole groups 77a adjacent to each other in the circumferential direction Dc. Namely, the group intervals dg1 are the same as each other. Therefore, in the present embodiment, each of the group intervals dg1 is also the minimum group interval dg1. The hole interval (channel interval) between two cooling holes 78 of one hole group 77a in the circumferential direction Dc is a first hole interval (first channel interval) dh1. In addition, the hole interval between the cooling hole 78 of two cooling holes 78 of one hole group 77a, the cooling hole 78 being closest to the dummy hole 79 of the hole group 77a, and the dummy hole 79 in the circumferential direction Dc is a second hole interval (second channel interval) dh2. One of the first hole interval dh1 and the second hole interval dh2 is a maximum hole interval (maximum channel interval), and the other is a minimum hole interval (minimum channel interval).

$$dg1 > dgc > (dga, dh1, dh2)$$

The magnitude relationship between dga, dh1, and dh2 does not matter.

The magnitude relationship between the dimensions described above is a magnitude relationship in the inner groove side surface 76i in which the outer opening 78o of the cooling hole 78 and the outer opening 78o of the dummy hole 79 are formed. However, in the present embodiment, a magnitude relationship between the dimensions in the radial inner surface 82 in which the inner opening 78i of the cooling hole 78 and the inner opening 78i of the dummy hole 79 are formed, and a magnitude relationship between the dimensions at a position between the inner groove side surface 76i and the radial inner surface 82 are the same as the magnitude relationship between the dimensions in the inner groove side surface 76i.

In the present embodiment, as described above, the circumferential group width dgc is smaller than the minimum group interval dg1. Therefore, the hole intervals dh1 and dh2 between three holes forming one hole group 77a are smaller than the minimum group interval dg1. For this reason, also in the present embodiment, the stress concentration in the vicinity of the opening of the cooling hole 78 can be reduced, and the durability of the rotor disc 60a can be improved. In particular, in the present embodiment, since the number of the holes forming the hole group 77a is larger than the number of the holes forming the hole group 77 of the first embodiment, the stress concentration in the vicinity of the opening of the cooling hole 78 can be reduced more than in the first embodiment.

The hole group 77a of the present embodiment and the hole group 77 of the first embodiment includes two cooling holes 78; however, when the flow rate of the cooling air which is necessary and sufficient to cool the rotor blade 44 is satisfied with one cooling hole 78, one of the two cooling holes 78 may function as one dummy hole 79. In addition, the hole group 77a of the present embodiment includes one of three holes as the dummy hole 79, but all three holes may function as the cooling holes 78. Further, the hole group 77a of the present embodiment includes three holes, but may include four or more holes. In this case, at least one of the four or more holes needs to be the cooling hole 78.

The above-described tensile stress generated in the rotor disc 60a is larger in the radial inner surface 82 than in the inner groove side surface 76i of the small-diameter portion 72. For this reason, stress generated around the inner opening 78i of the cooling hole 78 is also larger than stress generated around the outer opening 78o of the cooling hole 78. Therefore, all the plurality of holes of the hole group 77a need to be open in the radial inner surface 82 of the small-diameter portion 72. On the other hand, all the plurality of holes of the hole group 77a do not need to be open in the inner groove side surface 76i of the small-diameter portion 72. For this reason, the dummy hole 79 that is one of the plurality of holes of the hole group 77a may not be open in the inner groove side surface 76i of the small-diameter portion 72.

Third Embodiment of Rotor Disc

Hereinafter, a rotor disc of the present embodiment will be described with reference to FIGS. 11 to 13.

A rotor disc 60b of the present embodiment has a different configuration of a plurality of hole groups from that of the rotor disc 60 of the first embodiment, and has basically the same other configurations as those of the rotor disc 60 of the first embodiment. Therefore, hereinafter, a plurality of hole groups (channel groups) 77b in the rotor disc 60b of the present embodiment will be mainly described.

Figure 11:
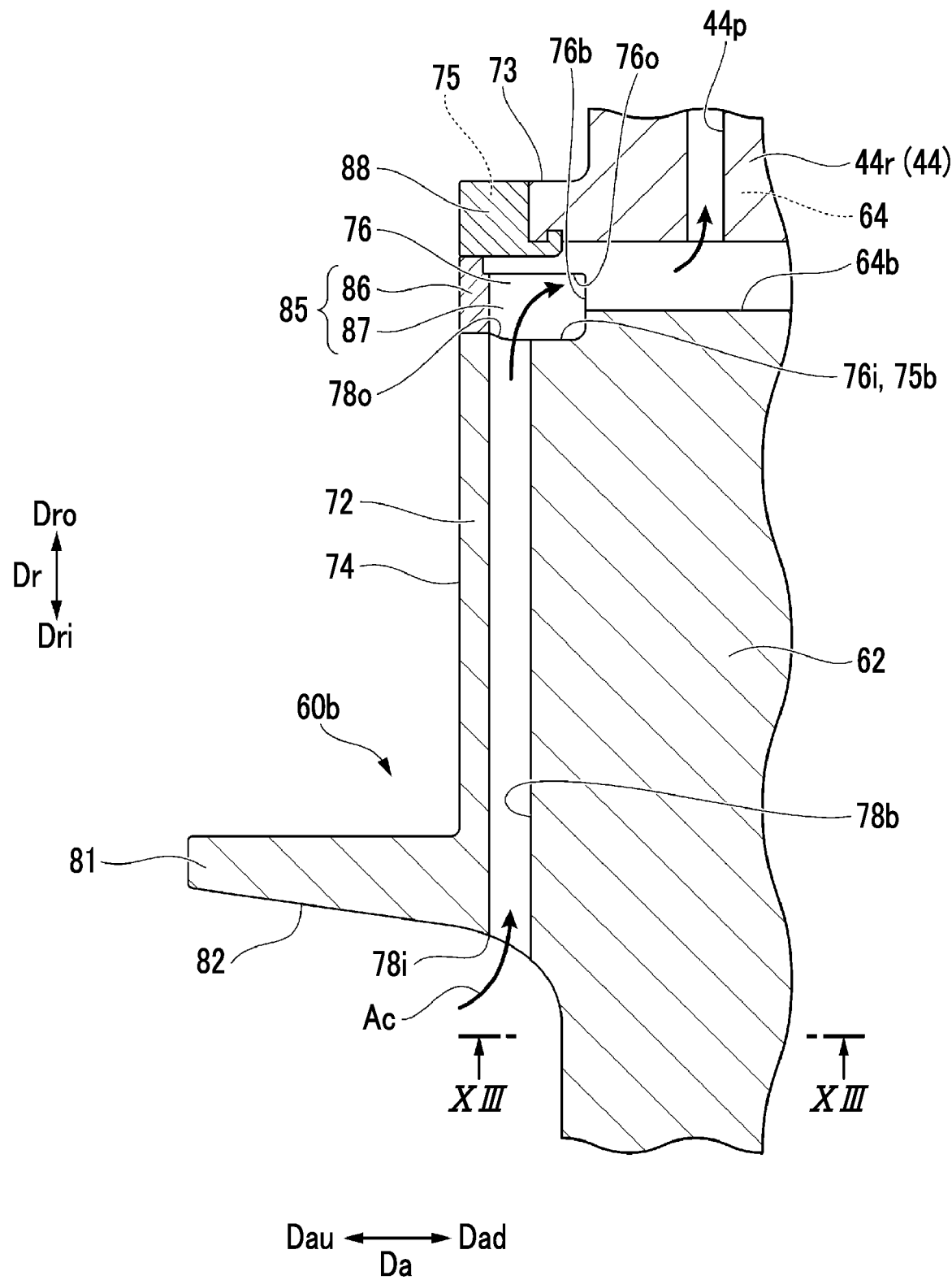
FIG. 11 is a sectional view of a main part of a turbine disc as a third embodiment according to the present invention.
Figure 12:
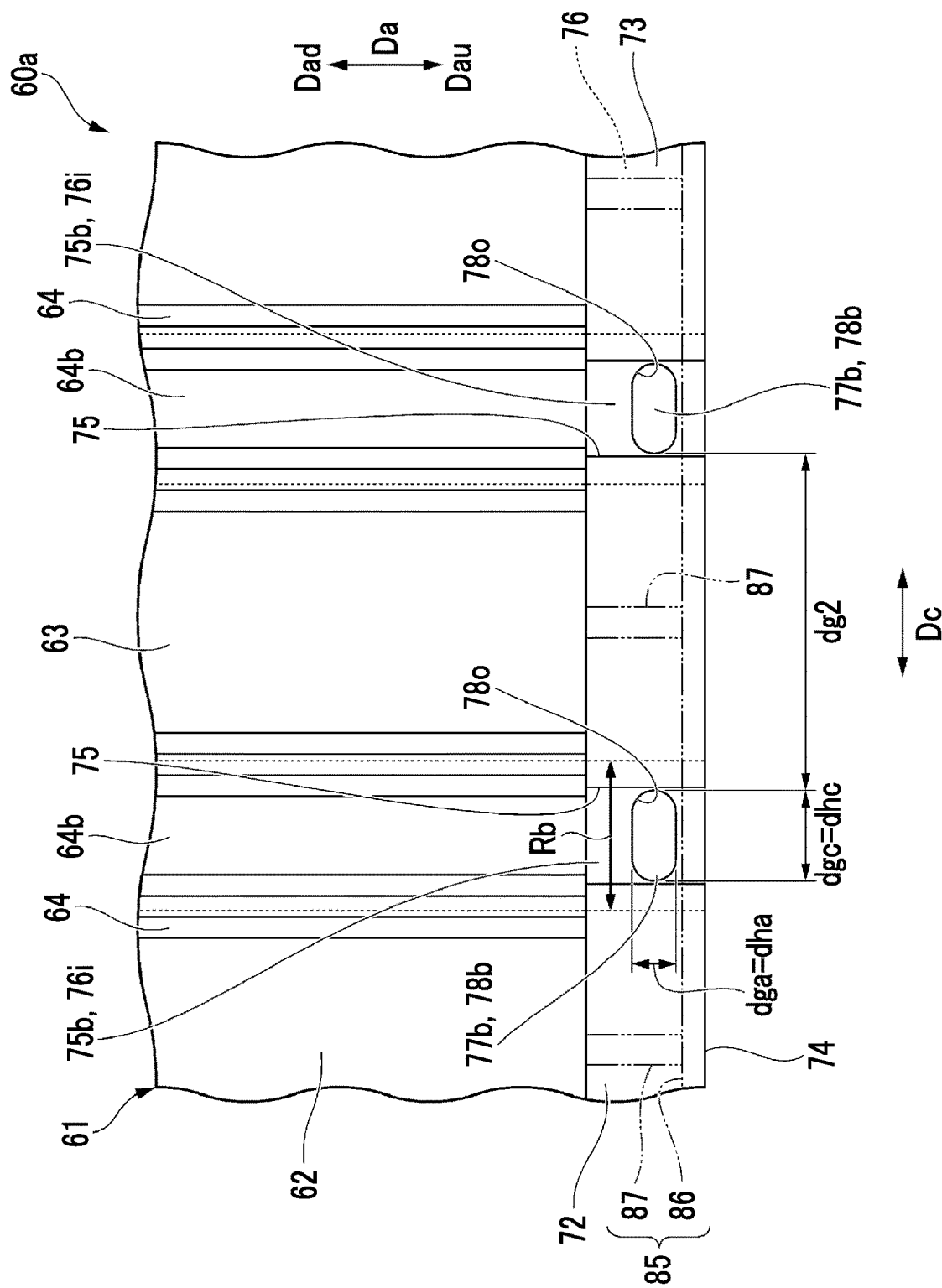
FIG. 12 is a view of a disc body as the third embodiment according to the present invention as seen from the radial outer side.
Figure 13:
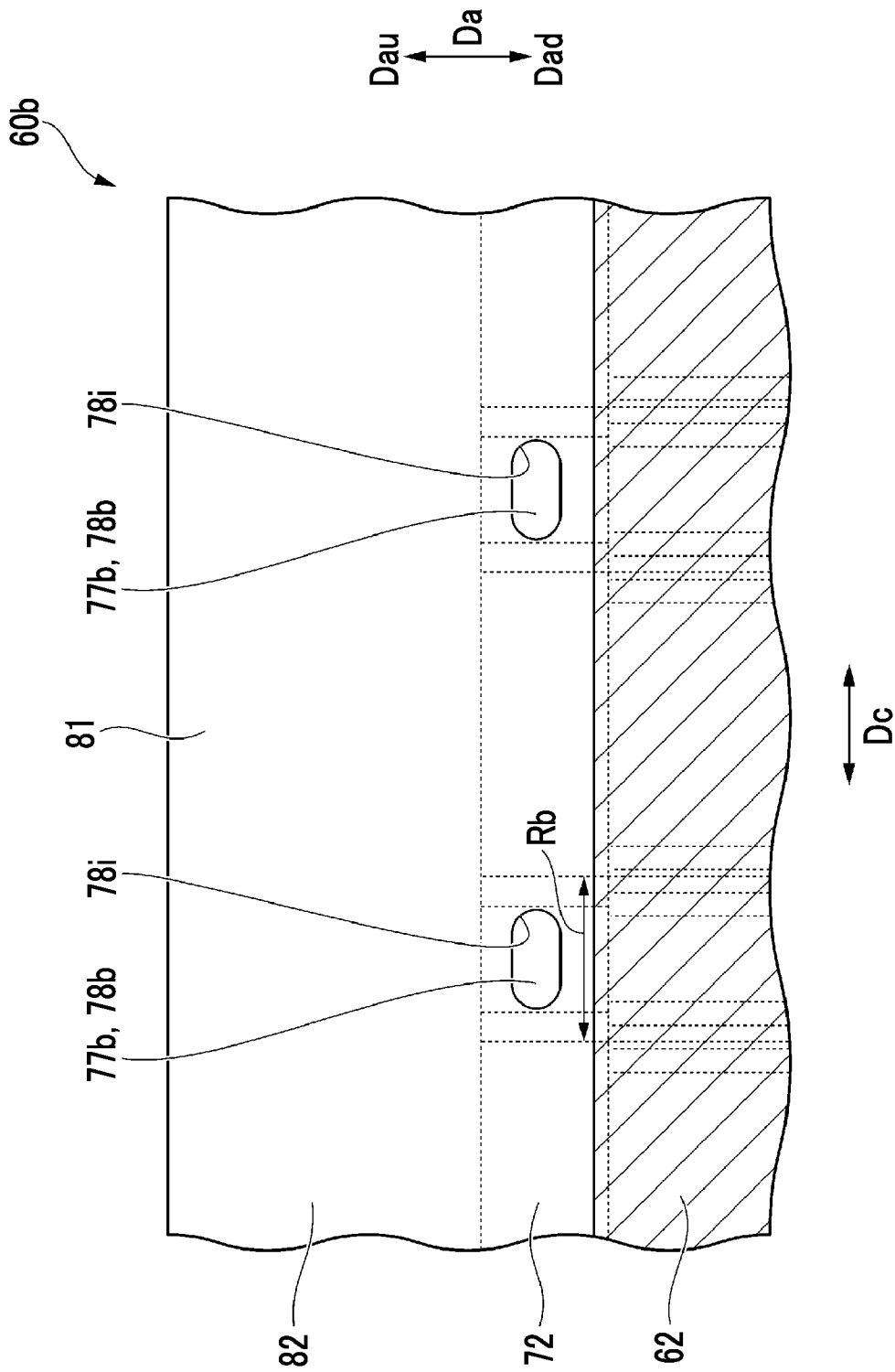
FIG. 13 is a sectional view taken along line XIII-XIII in FIG. 11.

As illustrated in FIGS. 11 to 13, in the present embodiment, each of the plurality of hole groups 77b includes one hole (channel) recessed from the radial inner surface 82 of the upstream extension portion 81 toward a radial outer side. The hole forms a cooling hole (cooling channel) 78b penetrating from the radial inner surface 82 of the upstream extension portion 81 to the radial outer surface that is the groove bottom surface 75b of the communication groove 75 (inner groove side surface 76i of the annular groove 76). The cooling hole 78b has an oval cross-sectional shape in a plane perpendicular to the radial direction Dr in which the cooling hole 78b extends. Therefore, the shape of the inner opening 78o of the cooling hole 78b is also an oval as illustrated in FIG. 13, and the shape of the outer opening 78i of the cooling hole 78b is also an oval as illustrated in FIG. 12. The oval is the shape of a running track, and is a shape in which two semi-arcs facing each other with an interval therebetween are connected by two straight lines parallel to each other. In the present embodiment, a longitudinal direction of the oval is the circumferential direction Dc. For this reason, a circumferential opening width dhc that is a width of the inner opening 78i of the cooling hole 78b in the circumferential direction Dc is larger than an axial opening width dha that is a width of the inner opening 78i in the axial direction Da. In addition, the circumferential opening width dhc that is the width of the outer opening 78o of the cooling hole 78b in the circumferential direction Dc is larger than the axial opening width dha that is the width of the outer opening 78o in the axial direction Da.

Similarly to the cooling hole 78 of the first embodiment, the position of the outer opening 78o of the cooling hole 78b in the circumferential direction Dc is in the region Rb in the circumferential direction Dc in which the groove bottom surface 64b of the blade root groove 64 is present. In the circumferential direction Dc, each of the plurality of partition pieces 87 of the seal ring 85 is located between the region Rb and the region Rb in the circumferential direction Dc in which the groove bottom surface 64b of another blade root groove 64 adjacent to the blade root groove 64 is present. For this reason, a space in the annular groove 76 is partitioned by the partition piece 87 in the circumferential direction Dc into a space of a portion in which a blade root groove 64 is present and a space of a portion in which another blade root groove 64 adjacent to the blade root groove 64 in the circumferential direction Dc is present.

The circumferential group width dgc of each of the plurality of hole groups 77b is equal to the circumferential opening width dhc of the cooling holes 78b. The circumferential group width dgc and the circumferential opening width dhc are larger than the axial group width dga of each of the plurality of hole groups 77b, and are smaller than a minimum group interval dg2 of group intervals, each of which is an interval between the plurality of hole groups 77b in the circumferential direction Dc. The axial group width dga is equal to the axial opening width dha of the cooling hole 78b. The circumferential group widths dgc of the plurality of hole groups 77b are the same as each other. A group interval dg2 between two hole groups 77b adjacent to each other in the circumferential direction Dc is the same as the group interval dg2 between another two hole groups 77b adjacent to each other in the circumferential direction Dc. Namely, the group intervals dg2 are the same as each other. Therefore, in the present embodiment, each of the group intervals dg2 is also the minimum group interval dg2. A magnitude relationship between the dimensions is as follows.

$$dg2 > dgc = dhc > dga = dha$$

The magnitude relationship between the dimensions described above is a magnitude relationship in the groove bottom surface 75b in which the outer opening 78o of the cooling hole 78b is formed. However, in the present embodiment, a magnitude relationship between the dimensions in the radial inner surface 82 in which the inner opening 78i of the cooling hole 78b is formed, and a magnitude relationship between the dimensions at a position between the groove bottom surface 75b and the radial inner surface 82 are the same as the magnitude relationship between the dimensions in the groove bottom surface 75b.

In the present embodiment, the outer opening 78o and the inner opening 78i of the cooling hole 78b have a shape in which openings of two holes are connected to each other in the circumferential direction Dc. For this reason, in the present embodiment, stress generated around the outer opening 78o of the cooling hole 78b and stress generated around the inner opening 78i are dispersed in the circumferential direction Dc. Therefore, also in the present embodiment, the stress concentration in the vicinity of the opening of the cooling hole 78b can be reduced, and the durability of the rotor disc 60b can be improved.

Figure 14:
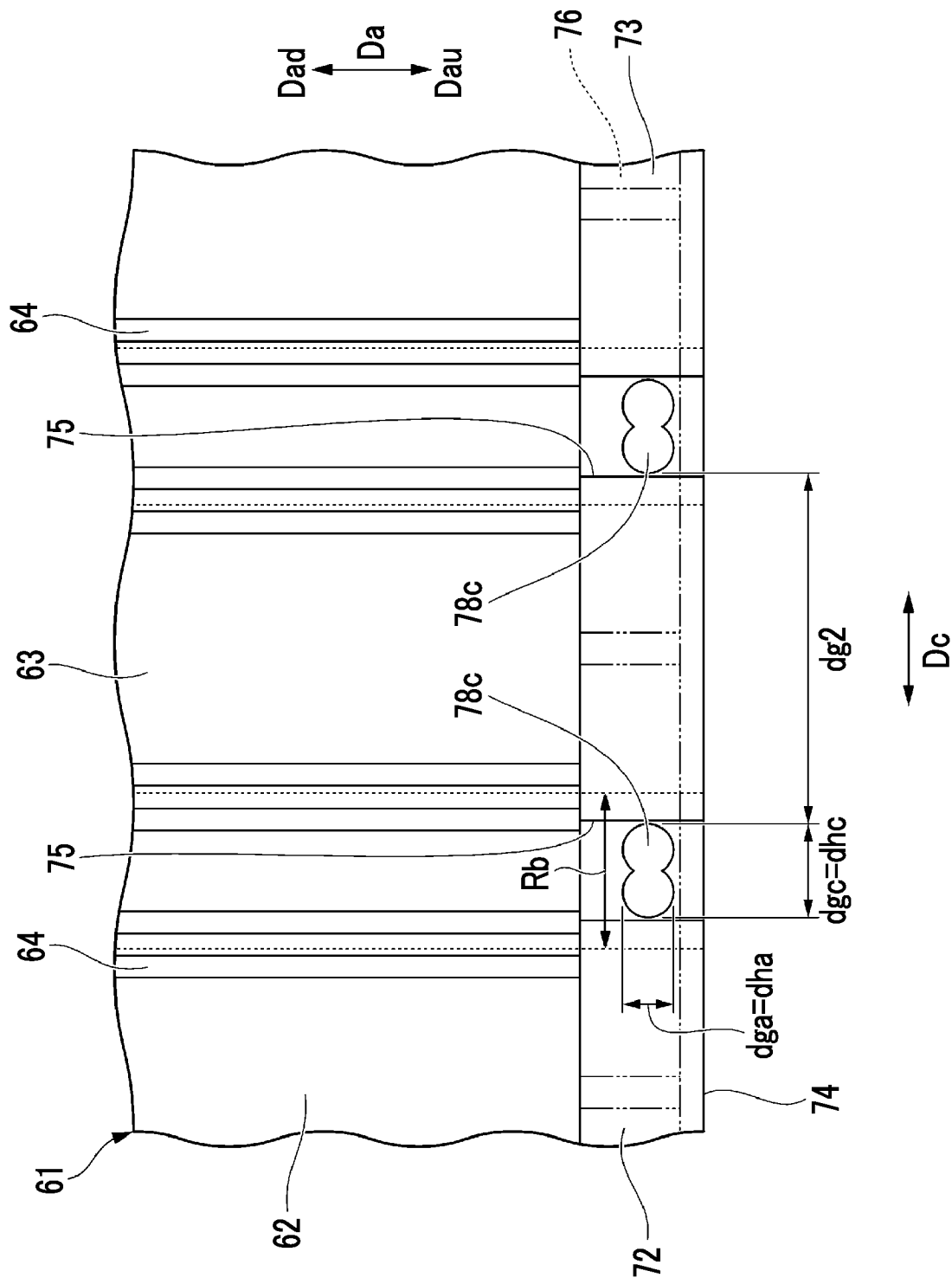
FIG. 14 is a view of a disc body as a first modification example of the third embodiment according to the present invention as seen from the radial outer side.
Figure 15:
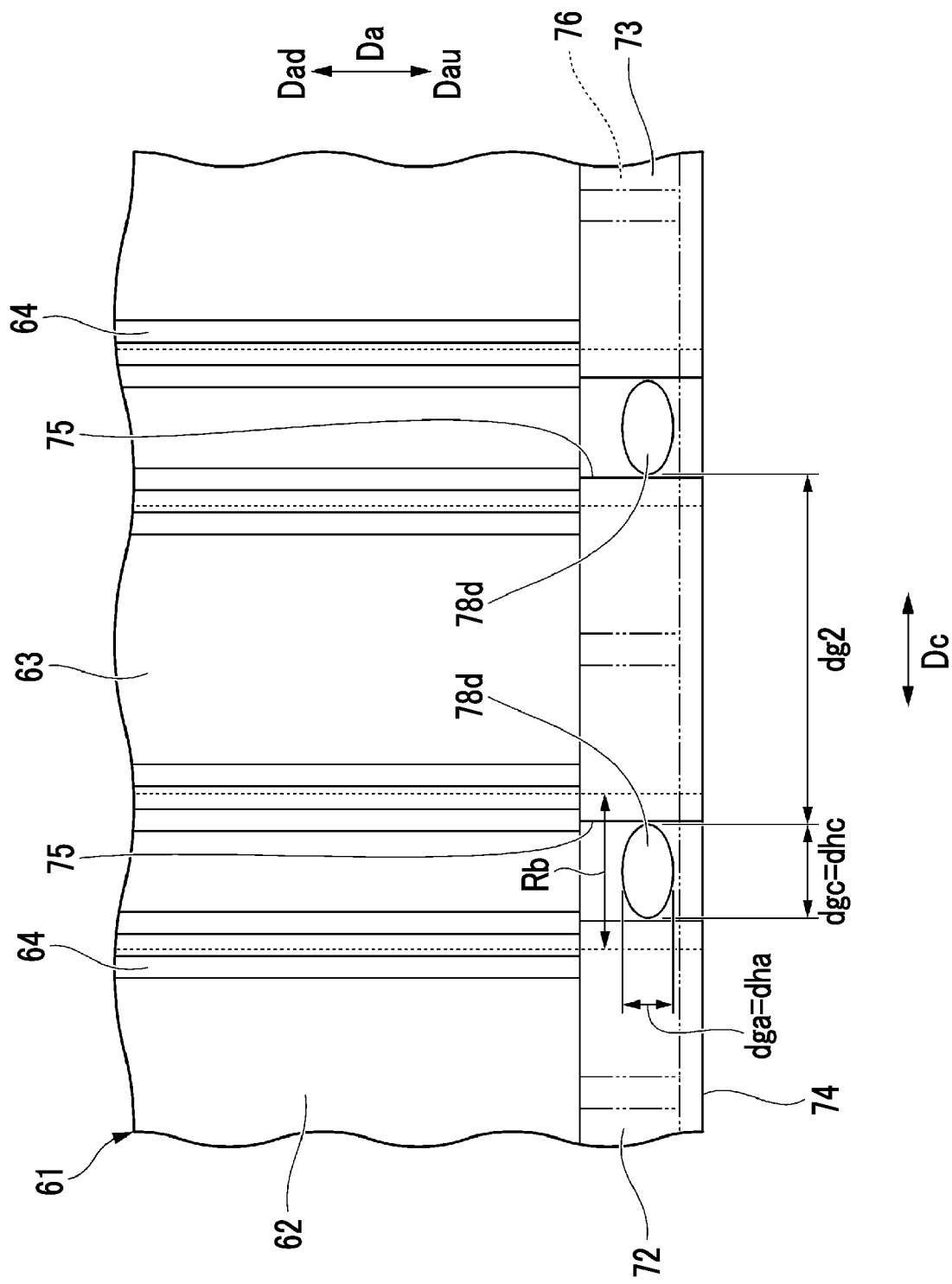
FIG. 15 is a view of a disc body as a second modification example of the third embodiment according to the present invention as seen from the radial outer side.

In the cooling hole 78b of the present embodiment, both the shape of the inner opening 78i and the shape of the outer opening 78o are an oval. As described above, stress generated around the inner opening 78i of the cooling hole 78b is larger than stress generated around the outer opening 78o of the cooling hole 78b. For this reason, the shape of the inner opening 78i of the cooling hole 78b may be an oval, and the shape of the outer opening 78o of the cooling hole 78b may be a circle. In addition, the shape of the opening of the cooling hole 78b does not need to be an oval which is long in the circumferential direction Dc as long as the circumferential opening width dhc of the cooling hole 78b is larger than the axial opening width dha. Specifically, as illustrated in FIG. 14, the shape of an opening of a cooling hole (cooling channel) 78c may be a shape in which two circles partly overlap each other in the circumferential direction Dc. In addition, as illustrated in FIG. 15, the shape of an opening of a cooling hole (cooling channel) 78d may be an elliptical shape that is long in the circumferential direction Dc.

In addition, similarly to the second embodiment, the hole group 77b of the present embodiment may also include the dummy hole 79 in addition to the cooling hole 78b.

Various Modification Examples

The rotor discs of the first and third embodiments include the annular groove 76. However, the rotor discs of the first and third embodiments may not include the annular groove 76. When no annular groove 76 is provided, the seal ring 85 that closes the opening of the annular groove 76 is not required.

In each of the embodiments described above, the plurality of hole groups are arranged at equal intervals in the circumferential direction Dc. However, the plurality of hole groups may be arranged in the circumferential direction Dc but not at equal intervals.

Figure 16:
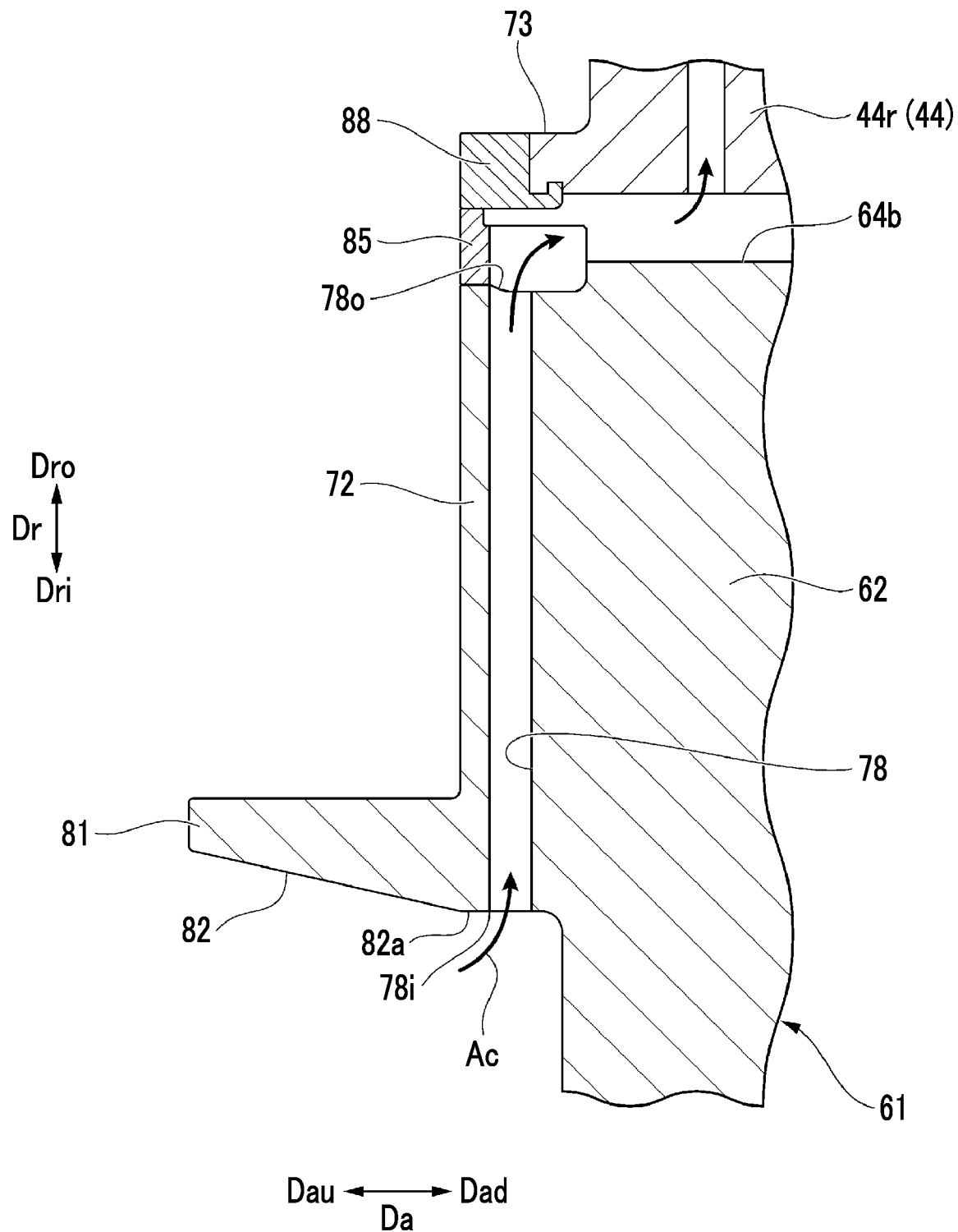
FIG. 16 is a sectional view of a main part of a rotor disc as a modification example of the first embodiment according to the present invention.

In each of the embodiments described above, a region around the inner opening of the hole on the radial inner surface 82 is inclined in a direction in which the hole extends on a virtual plane including the axis Ar and the hole, namely, in the radial direction. In other words, as illustrated in FIG. 6 and the like, the region around the inner opening on the radial inner surface 82 is an inclined surface that gradually approaches the radial inner side Dri toward the axial downstream side Dad. In this case, an angle θd at a corner between a generating line on the axial downstream side Dad of the columnar hole and the inclined surface is an obtuse angle, and an angle θu at a corner between a generating line on the axial upstream side Dau of the columnar hole and the inclined surface is an acute angle. For this reason, stress is concentrated at an edge of the inner opening on the axial upstream side Dau. Therefore, as illustrated in FIG. 16, it is preferable that a region inner surface 82a around the inner opening of the hole on the radial inner surface 82 is perpendicular to the direction in which the hole extends on the virtual plane including the axis Ar and the hole. In such a manner, both the angle at the corner between the generating line on the axial downstream side Dad of the columnar hole and the region inner surface 82a and the angle at the corner between the generating line on the axial upstream side Dau of the columnar hole and the region inner surface 82a are 90°, so that stress can be prevented from being concentrated at the edge of the inner opening 78i on the axial upstream side Dau.

In each of the embodiments described above, the direction in which the hole extends is the radial direction perpendicular to the axis Ar. However, the direction in which the hole extends may be gradually inclined toward the axial downstream side Dad toward the radial outer side Dro. When the direction in which the hole extends is inclined in such a manner, as described above, even in the case where the region around the inner opening 78i on the radial inner surface 82 is an inclined surface that gradually approaches the radial inner side Dri toward the axial downstream side Dad, the direction in which the hole extends can be made perpendicular to the inclined surface. In addition, when the direction in which the hole extends is inclined in such a manner, the cooling hole 78b is capable of directly communicating with the space in the blade root groove 64 without having to go through the space in the communication groove 75.

INDUSTRIAL APPLICABILITY

According to one aspect of the present invention, the stress concentration in the vicinity of the opening of the cooling hole can be reduced, and the durability of the rotor disc can be improved.

REFERENCE SIGNS LIST

10: Gas turbine
11: Gas turbine rotor
15: Gas turbine casing
16: Intermediate casing
20: Compressor
21: Compressor rotor
22: Rotor shaft
23: Rotor blade row
25: Compressor casing
26: Stator blade row
30: Combustor
40: Turbine
41: Turbine rotor
42: Rotor shaft
42p: Cooling air flow path
42d, 60, 60a, 60b: Rotor disc
42s: Spindle bolt
43: Rotor blade row
44: Rotor blade
44b: Blade body
44f: Platform
44r: Blade root
44p: Cooling air passage
45: Turbine casing
45a: Outer casing
45b: Inner casing
45c: Heat shield ring
45d: Ring segment
46: Stator blade row
47: Stator blade
49: Combustion gas flow path
50: Cooling device
51: Air bleeding line
52: Cooler
53: Cooling air line
54: Booster
61: Disc body
62: Large-diameter portion
63: Outer peripheral surface (or radial outer surface)
64: Blade root groove
64b: Groove bottom surface (or radial outer surface)
72: Small-diameter portion
73: Outer peripheral surface
74: Front surface
75: Communication groove
75b: Groove bottom surface
76: Annular groove
76i: Inner groove side surface
76o: Outer groove side surface
76b: Groove bottom surface
77, 77a, 77b: Hole group
78, 78b, 78c, 78d: Cooling hole
78i: Inner opening
78o: Outer opening
79: Dummy hole
81: Upstream extension portion
82: Radial inner surface
82a: Region inner surface
83: Downstream extension portion
85: Seal ring
86: Ring piece
87: Partition piece
88: Seal cap
89: Plug
A: Air
Ac: Cooling air
F: Fuel
G: Combustion gas
dh: Hole interval
dhc: Circumferential opening width
dha: Axial opening width
dgc: Circumferential group width
dga: Axial group width
dg: Minimum group interval
Ar: Axis
Da: Axial direction
Dau: Axial upstream side
Dad: Axial downstream side
Dc: Circumferential direction
Dr: Radial direction
Dri: Radial inner side
Dro: Radial outer side

The invention claimed is:

1. A rotor disc comprising:
a first diameter portion having a substantially columnar shape around an axis;

a second diameter portion having a substantially columnar shape around the axis; and an upstream extension portion extending from an axial upstream side of the second diameter portion toward an axial upstream direction, wherein a radius of the first diameter portion is larger than a radius of the second diameter portion, wherein the second diameter portion is provided on an axial upstream side of the first diameter portion, wherein the first diameter portion includes:
   a first outer peripheral surface facing outward and away from the axis in a radial direction with respect to the axis; and
   a plurality of blade root grooves which are recessed radially inward from the first outer peripheral surface, and which are arranged in a circumferential direction with respect to the axis, wherein the second diameter portion includes:
   a second outer peripheral surface facing outward and away from the axis in the radial direction;
   a front surface facing in the axial upstream direction, the upstream extension portion extending from the front surface;
   a plurality of communication grooves which are recessed radially inward from the second outer peripheral surface, each communication groove of the plurality of communication grooves including a communication groove bottom surface which faces radially outward;

an annular groove recessed from the front surface in an axial downstream direction, the annular groove extending in the circumferential direction with respect to the axis and including an inner groove side surface which faces radially outward; and a plurality of channel groups formed for the plurality of blade root grooves, respectively, and arranged in the circumferential direction, wherein the upstream extension portion has a radial inner surface which faces inward in the radial direction, and which is located radially inward of the communication groove bottom surface and the inner groove side surface, wherein each channel group of the plurality of channel groups includes a plurality of channels which are recessed radially outward from the radial inner surface and which are arranged in the circumferential direction, wherein at least one of the plurality of channels is a cooling channel penetrating from the radial inner surface to the communication groove bottom surface or the inner groove side surface, wherein for each channel group of the plurality of channel groups, an outermost width of the plurality of channels of the channel group in the circumferential direction is larger than a width of the plurality of channels of the channel group in an axial direction in which the axis extends, and is smaller than a minimum interval of intervals between adjacent channel groups of the plurality of channel groups in the circumferential direction, wherein each cooling channel communicates with a respective blade root groove of the plurality of blade root grooves, and wherein for each channel group of the plurality of channel groups, an entirety of each channel of the plurality of channels of the channel group is arranged within the second diameter portion.

2. The rotor disc according to claim 1,
wherein for each channel group of the plurality of channel groups, a maximum channel interval of intervals between the plurality of channels of the channel group in the circumferential direction is smaller than the minimum interval of the intervals between adjacent channel groups of the plurality of channel groups in the circumferential direction.

3. The rotor disc according to claim 1,
wherein for each channel group of the plurality of channel groups, all of the channels of the plurality of channels of the channel group are the cooling channels.

4. The rotor disc according to claim 1,
wherein a position of an opening of the cooling channel on the communication groove bottom surface or the inner groove side surface in the circumferential direction is in a region in the circumferential direction in which a groove bottom surface of each of the plurality of the blade root grooves is present.

5. The rotor disc according to claim 1,
wherein a region of the radial inner surface around an opening of each channel of the plurality of channels of each of the plurality of channel groups on the radial inner surface is perpendicular to a direction in which the channel extends on a virtual plane including the axis and the channel.

6. A rotor shaft comprising:
a plurality of the rotor discs according to claim 1; and
a spindle bolt penetrating through the plurality of rotor discs in the axial direction to connect the plurality of rotor discs to each other, the rotor discs being arranged in the axial direction.

7. A turbine rotor comprising:
the rotor shaft according to claim 6; and
a plurality of rotor blades mounted in the plurality of blade root grooves, respectively, of each of the plurality of rotor discs.

8. A gas turbine comprising:
the turbine rotor according to claim 7; and
a turbine casing covering an outer periphery of the turbine rotor.

* * * * *